(12) United States Patent
Rapaka et al.

(10) Patent No.: US 9,294,776 B2
(45) Date of Patent: Mar. 22, 2016

(54) PARALLEL PROCESSING FOR VIDEO CODING

(71) Applicant: QUALCOMM Incorporated, San Diego, CA (US)

(72) Inventors: Krishnakanth Rapaka, San Diego, CA (US); Xiang Li, San Diego, CA (US); Jianle Chen, San Diego, CA (US); Ye-Kui Wang, San Diego, CA (US); Wei Pu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 14/196,538

(22) Filed: Mar. 4, 2014

(65) Prior Publication Data

US 2014/0254669 A1 Sep. 11, 2014

Related U.S. Application Data

(60) Provisional application No. 61/773,095, filed on Mar. 5, 2013, provisional application No. 61/808,734, filed on Apr. 5, 2013, provisional application No. 61/819,494, filed on May 3, 2013.

(51) Int. Cl.
*H04N 7/12* (2006.01)
*H04N 19/17* (2014.01)
*H04N 19/50* (2014.01)
*H04N 19/503* (2014.01)
(Continued)

(52) U.S. Cl.
CPC ............... *H04N 19/17* (2014.11); *H04N 19/33* (2014.11); *H04N 19/436* (2014.11); *H04N 19/50* (2014.11); *H04N 19/503* (2014.11); *H04N 19/70* (2014.11); *H04N 19/80* (2014.11); *H04N 19/82* (2014.11)

(58) Field of Classification Search
CPC ..... H04N 19/17; H04N 19/70; H04N 19/503; H04N 19/436; H04N 19/33; H04N 19/80; H04N 19/50; H04N 19/82
USPC ..................................... 375/240.12
See application file for complete search history.

(56) References Cited

U.S. PATENT DOCUMENTS 8,050,326 B2  11/2011  Yoon et al.
8,229,274 B2   7/2012  Jeon et al.
(Continued)

FOREIGN PATENT DOCUMENTS

WO     2008060125 A1    5/2008

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
(Continued)

*Primary Examiner* — Allen Wong
(74) *Attorney, Agent, or Firm* — Shumaker & Sieffert, P.A.

(57) ABSTRACT

In one example, a device for coding video data includes a video coder configured to code, for a tile of an enhancement layer picture, data indicating a number of tiles in a base layer picture that need to be coded before the tile of the enhancement layer picture can be coded, code tiles of the base layer picture corresponding to the number of tiles, and, after coding the tiles of the base layer picture, code the tile of the enhancement layer picture substantially in parallel with at least one other tile in the base layer picture.

36 Claims, 18 Drawing Sheets

(51) Int. Cl.
  *H04N 19/70* (2014.01)
  *H04N 19/80* (2014.01)
  *H04N 19/82* (2014.01)
  *H04N 19/33* (2014.01)
  *H04N 19/436* (2014.01)

(56) References Cited

U.S. PATENT DOCUMENTS

| 8,432,968 | B2 | 4/2013 | Ye et al. |
|---|---|---|---|
| 2006/0209959 | A1 | 9/2006 | Sun |
| 2007/0291847 | A1* | 12/2007 | Shimauchi ........... H04N 19/107 375/240.16 |
| 2008/0165850 | A1 | 7/2008 | Sagetong et al. |
| 2009/0097549 | A1* | 4/2009 | Kim ...................... H04N 19/70 375/240.03 |
| 2011/0116549 | A1 | 5/2011 | Sun |
| 2013/0194384 | A1 | 8/2013 | Hannuksela |
| 2014/0254666 | A1 | 9/2014 | Rapaka et al. |
| 2014/0254667 | A1 | 9/2014 | Rapaka et al. |
| 2014/0254668 | A1 | 9/2014 | Rapaka et al. |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen, et al., "SHVC Test Model 1 (SHM 1)," JCT-VC Meeting; 103. MPEG Meeting; Jan. 14-23, 2013; Geneva; (Joint collaborative team on video coding of ISO/IEC JTC1/SC29/WG11 and ITU-T SG.16); URL: http://wftp3.itu.int/av-arch/jctvc-site/,, No. JCTVC-L1007, XP030113952, 42 pp.
Chuang, et al., "AHG9: Inter-layer prediction flag and inter-layer syntax prediction flag", JCT-VC Meeting; MPEG Meeting; Jan. 14-23, 2013; Geneva; (Joint Collaborative Team on Video Coding of ISO/IEC JTC1/SC29/WG11 and ITU-T SG.16); URL:http:/iwftp3.1tu.int/av-arch/jctvc-site/, No. JCTVC-L0071, XP030113559, 5 pp.
Coban, et al., "AHG4: on tiles and wavefronts", JCT-VC Meeting; MPEG Meeting; Jul. 11-20, 2012; Stockholm; (Joint Collaborative Team on Video Coding of ISO/IEC JTC1/SC29/WG11 and ITU-T SG.16); URL: http://wftp3.itu.int/av-arch/jctvc-site No. JCTVC-J0123, XP030112485, 6 pp.
Francois, et al., "Extended Spatial scalability: A generalization of spatial scalability for SVC extension of AVC/H.264," 25. Picture coding symposium; Apr. 24-26, 2006; Beijing, XP030080338, 6 pp.
Fuldseth, et al., "Tiles," JCT-VC Meeting; MPEG Meeting; Jul. 14-22, 2011: Torino; (Joint collaborative team on Video coding of ISO/IEC JTC1/SC29/WG11 and ITU-T SG.16); URL: http://wftp3.itu.int/av-arch/jctvc-site/ No. JCTVC-F335, XP030009358, 15 pp.
Horowitz, et al., "Deblocking across slice and tile boundaries," JCT-VC Meeting; MPEG Meeting; Apr. 27-May 7, 2012; Geneva; (Joint collaborative team on video coding of ISO/IEC JTC11SC29/WG11 and ITU-T SG.16); URL: http://wftp3.itu.int/av-arch/jctvc-site/ No. JCTVC-I0043, XP030111806, 4 pp.

International Preliminary Report on Patentability—PCT/US2014/020724, The International Bureau of WIPO—Geneva, Switzerland, Feb. 20, 2015.
International Search Report and Written Opinion—PCT/US2014/020724—ISA/EPO—Jun. 4, 2014.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Kim, et al., "Description of scalable video coding technology proposal by LG Electronics and MediaTek (differential coding mode on)", JCT-VC Meeting; MPEG Meeting; Oct. 10-19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/, No. JCTVC-K0033, XP030112965, 38 pp.
Lasserre, et al., "Description of the scalable video coding technology proposal by Canon Research Centre France," 102. MPEG Meeting; Oct. 15-19, 2012; Shanghai; (Motion Picture Expert Group or ISO/IEC JTC1/SC29/WG11), No. m26540, XP030054873, 78 pp.
Marquant, et al., "Extended spatial scalability for non-dyadic video formats: from SDTV to HDTV," Visual communications and Image processing; Jul. 12-15, 2005; Beijing, XP030080894, 12 pp.
Rapaka, et al., "MV-HEVC/SHVC HLS: Bitstream restrictions on tiles and wavefonts across layers," JCT-3V Meeting;.Jul. 27-Aug. 2, 2013; Vienna; (Joint Collaborative Team on 3D Video Coding Extension Development of ISO/IEC JTC1/SC29/WG11 and ITU-T SG.16); URL: http://phenix.int-evry.fr/jct2/, No. JCT3V-E0070, XP030131073, 4 pp.
Rapaka, et al., "MV-HEVC/SHVC HLS" Parallel Processing Indications for tiles in HEVC Extensions, JCT-3V Meeting; Jul. 27-Aug. 8, 2013; Viena; (Joint collaborative team on 3D Video coding extension development of ISO/IEC JTC1/SC29/WG11 and ITU-T SG.16); URL: http://phenix.int-evry.fr/jct2/,, No. JCT3V-E0071, XP030131074, 4 pp.
Rapaka, et al., "Parallel processing Indications for tiles in HEVC Extensions," MPEG Meeting; Apr. 22-26, 2013; Incheon; (Motion Picture Expert Group or ISO/IEC JTC1/SC29/WG11), No. m28797, XP030057330, 3 pp.
Reichel, "Working Draft 1.0 of 14496-10:200x/AMD1 Scalable Video Coding," MPEG Meeting; Jan. 17-21, 2005; Hong Kong; (Motion Pictureexpert Group or ISO/IEC JTC1/SC29/WG11), No. N6901, XP030013621, 82 pp.
Sjaberg, et al., "AHG4: Enabling decoder parallelism with tiles," JCT-VC Meeting; MPEG Meeting; Apr. 27-May 7, 2012; Geneva; (Joint Collaborative Team on Video Coding of ISO/IEC JTC1/SC2911/WG11 and ITU-T SG.16); URL: http://wftp3.itu.int/av-arch/jctvc-site/, No. JCTVC-10233, XP030111996, 14 pp.
Suehring, et al., "Indication of tile boundary alignment," JCT-VC Meeting; MPEG Meeting; Jan. 14-23, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-L0197, XP030113685, 1 pp.
Suehring, et al., "Indication of tile boundary alignment," JCT-VC Meeting; MPEG Meeting; Apr. 18-26, 2013; Incheon; (Joint collaborative Team on video coding of ISO/IEC JTC1/SC29/WG and ITU-T SG); URL: http://wftp3.itu.int/av-arch/jctvc-site/, No. JCTVC-M0202, XP030114159, 3 pp.
Suhring, et al., "Tile Boundary alignment and Inter-layer prediction constraints for SHVC and MV-HEVC," Apr. 25, 2013, XP055117670, Retrieved from the Internet < URL: http://phenix.it-sudparis.eu/jct/doc_end_user/documents/13_Incheon/wg11/JCTVC_M0464_v1.zip >, 5 pp.
Tech, et al., "AHG 13: Restriction of inter-layer prediction on tile boundaries," 104. MPEG Meeting; Apr. 22-26, 2013; Incheon; (Motion Picture expert group or ISO/IEC JTC1/SC29/WG11), No. m28814, XP030057347, 3 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.

(56) References Cited

OTHER PUBLICATIONS

Wiegand et al., "WD3: Working Draft 3 of High-Efficiency Video Coding," Document JCTVC-E603, 5th Meeting: Geneva, CH, Mar. 16-23, 2011, 193 pp.

Yamamoto, et al., "Description of scalable video coding technology proposal by Sharp (proposal 2)," 102. MPEG Meeting; Oct. 15-19, 2012; Shanghai; (Motion Picture Expert Group or ISO/IEC JTC1/SC29/WG11), No. m26599, XP030054932, 17 pp.

Ye, et al., "SEI Message: independently decodable regions based on tiles," JCT-VC Meeting; MPEG Meeting; Jan. 14-23, 2013; Geneva; (Joint collaborative team on Video coding of ISO/IEC JTC1/SC29/WG11 and ITU-T SG.16); URL: http://wftp3.itu.int/av-arch/jctvc-site/, No. JCTVC-L0049, XP030113537, 6 pp.

Zhou "AHG4: Enable parallel decoding with tiles," JCT-VC Meeting; MPEG Meeting; Jul. 11-20, 2012; Stockholm;.(Joint collaborative team on video coding of ISO/IEC JTC1/SC29/WG11 and ITU-T SG.16); URL: http://wftp3.itu.int/av-arch/jctvc-site/,, No. JCTVC-J0088, XP030112450, 14 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Henry, et al., "Wavefront Parallel Processing", JCT-VC Meeting; MPEG Meeting; Mar. 16-23, 2011; Geneva, CH, Joint Collaborative Team on Video Coding (JCT-VC) of ITU-T SG16 WP3 and ISO/IEC JTC1/SC29/WG11 No. m19714, JCTVC-E196, 9 pp.

ITU-T H.265, Series H: Audiovisual and Multimedia Systems, Infrastructure of audiovisual services—Coding of moving video, High efficiency video coding, The International Telecommunication Union, Apr. 2015, 634 pp.

ITU-T H.265, Series H: Audiovisual and Multimedia Systems, Infrastructure of audiovisual services—Coding of moving video, High efficiency video coding, The International Telecommunication Union, Oct. 2014, 540 pp.

\* cited by examiner

| 0 | 1 | 2 | 3 | 12 | 13 | 14 | 21 | 22 | 23 | 24 |
|---|---|---|---|---|---|---|---|---|---|---|
| 4 | 5 | 6 | 7 | 15 | 16 | 17 | 25 | 26 | 27 | 28 |
| 8 | 9 | 10 | 11 | 18 | 19 | 20 | 29 | 30 | 31 | 32 |
| 33 | 34 | 35 | 36 | 41 | 42 | 43 | 47 | 48 | 49 | 50 |
| 37 | 38 | 39 | 40 | 44 | 45 | 46 | 51 | 52 | 53 | 54 |
| 55 | 56 | 57 | 58 | 63 | 64 | 65 | 69 | 70 | 71 | 72 |
| 59 | 60 | 61 | 62 | 66 | 67 | 68 | 73 | 74 | 75 | 76 |

FIG. 7

Enhancement layer

| 204A | 204B | 204C | 204D |
|------|------|------|------|
| 204E | 204F | 204G | 204H |

← 200

Reference layer

| 206A | 206B | 206C |
|------|------|------|
| 206D | 206E | 206F |

PARALLEL PROCESSING FOR VIDEO CODING

This application claims the benefit of U.S. Provisional Application Ser. No. 61/773,095 filed Mar. 5, 2013, U.S. Provisional Application Ser. No. 61/808,734 filed Apr. 5, 2013, and U.S. Provisional Application Ser. No. 61/819,494, filed May 3, 2013, the entire contents of each are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for parallel processing of video coding. For example, this disclosure describes techniques for parallel processing in scalable extensions of the High Efficiency Video Coding (HEVC) standard, although the techniques may be applied to other video coding standards and extensions of such standards, such as multiview HEVC (MV-HEVC). Several example solutions are described for efficiently performing parallel processing across layers (which may include scalable layers of various dimensions as well as multiple views), up-sampling, inter-layer filtering, inter-layer syntax prediction such as inter-layer motion/mode prediction, etc., and inter-layer texture predictions such as textureBl, inter-layer residual prediction, and the like, when more than one tile is used for each layer, and wherein each layer may be a scalable layer, a view, or a depth.

In one example, a method of decoding video data includes, when decoding an enhancement layer block in an enhancement layer tile of video data, preventing decoding of the enhancement layer block using inter-layer texture prediction or inter-layer syntax prediction from a collocated base layer block for which inter-layer filtering or reference layer filtering across boundaries of tiles in a reference layer picture in an access unit including both the enhancement layer tile and the base layer block is enabled, and decoding the collocated base layer block substantially in parallel with the enhancement layer block when inter-layer filtering or reference layer filtering across the boundaries of the tiles in the reference layer picture is enabled.

In another example, a method of encoding video data includes, when encoding an enhancement layer block in an enhancement layer tile of video data, preventing encoding of the enhancement layer block using inter-layer texture prediction or inter-layer syntax prediction from a collocated base layer block for which inter-layer filtering or reference layer filtering across boundaries of tiles in a reference layer picture in an access unit including both the enhancement layer tile and the base layer block is enabled, and encoding the collocated base layer block substantially in parallel with the enhancement layer block when inter-layer filtering or reference layer filtering across the boundaries of the tiles in the reference layer picture is enabled.

In another example, a device for coding video data includes a video coder (e.g., a video encoder or a video decoder) configured to, when coding an enhancement layer block in an enhancement layer tile of video data, prevent coding of the enhancement layer block using inter-layer texture prediction or inter-layer syntax prediction from a collocated base layer block for which inter-layer filtering or reference layer filtering across boundaries of tiles in a reference layer picture in an access unit including both the enhancement layer tile and the base layer block is enabled, and code the collocated base layer block substantially in parallel with the enhancement layer block when inter-layer filtering or reference layer filtering across the boundaries of the tiles in the reference layer picture is enabled.

In another example, a device for coding video data includes means for preventing coding, when coding an enhancement layer block in an enhancement layer tile of video data, the enhancement layer block using inter-layer texture prediction or inter-layer syntax prediction from a collocated base layer block for which inter-layer filtering or reference layer filtering across boundaries of tiles in a reference layer picture in an access unit including both the enhancement layer tile and the base layer block is enabled, and means for coding the collocated base layer block substantially in parallel with the enhancement layer block when inter-layer filtering or reference layer filtering across the boundaries of the tiles in the reference layer picture is enabled.

In another example, a computer-readable storage medium has stored thereon instructions that, when executed, cause a processor to when coding an enhancement layer block in an enhancement layer tile of video data, prevent coding of the enhancement layer block using inter-layer texture prediction or inter-layer syntax prediction from a collocated base layer block for which inter-layer filtering or reference layer filtering across boundaries of tiles in a reference layer picture in an access unit including both the enhancement layer tile and the base layer block is enabled, and code the collocated base layer block substantially in parallel with the enhancement layer block when inter-layer filtering or reference layer filtering across the boundaries of the tiles in the reference layer picture is enabled.

In another example, a method of decoding video data includes decoding data representative of whether a tile of an enhancement layer picture can be predicted using inter-layer prediction, and predicting data of the tile using inter-layer prediction only when the data indicates that the tile can be predicted using inter-layer prediction.

In another example, a method of encoding video data includes encoding data representative of whether a tile of an enhancement layer picture can be predicted using inter-layer prediction, and predicting data of the tile using inter-layer prediction only when the data indicates that the tile can be predicted using inter-layer prediction.

In another example, a device for coding video data includes a video coder (e.g., a video decoder or a video encoder) configured to code data representative of whether a tile of an enhancement layer picture can be predicted using inter-layer prediction, and predict data of the tile using inter-layer prediction only when the data indicates that the tile can be predicted using inter-layer prediction.

In another example, a device for coding video data includes means for coding data representative of whether a tile of an enhancement layer picture can be predicted using inter-layer prediction, and means for predicting data of the tile using inter-layer prediction only when the data indicates that the tile can be predicted using inter-layer prediction.

In another example, a computer-readable storage medium has stored thereon instructions that, when executed, cause a processor to code data representative of whether a tile of an enhancement layer picture can be predicted using inter-layer prediction, and predict data of the tile using inter-layer prediction only when the data indicates that the tile can be predicted using inter-layer prediction.

In another example, a method of decoding video data includes decoding a value for a syntax element representative of whether any two reference layer samples, collocated with two respective enhancement layer picture samples within a common enhancement layer tile, must be within a common reference layer tile, and decoding the enhancement layer picture samples based at least in part on the value of the syntax element.

In another example, a method of encoding video data includes encoding a value for a syntax element representative of whether any two reference layer samples, collocated with two respective enhancement layer picture samples within a common enhancement layer tile, must be within a common reference layer tile, and encoding the enhancement layer picture samples based at least in part on the value of the syntax element.

In another example, a device for coding video data includes a video coder (e.g., a video encoder or a video decoder) configured to code a value for a syntax element representative of whether any two reference layer samples, collocated with two respective enhancement layer picture samples within a common enhancement layer tile, must be within a common reference layer tile, and code the enhancement layer picture samples based at least in part on the value of the syntax element.

In another example, a device for coding video data includes means for coding a value for a syntax element representative of whether any two reference layer samples, collocated with two respective enhancement layer picture samples within a common enhancement layer tile, must be within a common reference layer tile, and means for coding the enhancement layer picture samples based at least in part on the value of the syntax element.

In another example, a computer-readable storage medium has stored thereon instructions that, when executed, cause a processor to code a value for a syntax element representative of whether any two reference layer samples, collocated with two respective enhancement layer picture samples within a common enhancement layer tile, must be within a common reference layer tile, and code the enhancement layer picture samples based at least in part on the value of the syntax element.

In another example, a method of decoding video data includes decoding, for a tile of an enhancement layer picture, data indicating a number of tiles in a base layer picture that need to be coded before the tile of the enhancement layer picture can be coded, decoding tiles of the base layer picture corresponding to the number of tiles, and, after decoding the tiles of the base layer picture, decoding the tile of the enhancement layer picture.

In another example, a method of encoding video data includes encoding, for a tile of an enhancement layer picture, data indicating a number of tiles in a base layer picture that need to be coded before the tile of the enhancement layer picture can be coded, encoding tiles of the base layer picture corresponding to the number of tiles, and, after encoding the tiles of the base layer picture, encoding the tile of the enhancement layer picture.

In another example, a device for coding video data includes a video coder (e.g., a video encoder or a video decoder) configured to code, for a tile of an enhancement layer picture, data indicating a number of tiles in a base layer picture that need to be coded before the tile of the enhancement layer picture can be coded, code tiles of the base layer picture corresponding to the number of tiles, and, after coding the tiles of the base layer picture, code the tile of the enhancement layer picture.

In another example, a device for coding video data includes means for coding, for a tile of an enhancement layer picture, data indicating a number of tiles in a base layer picture that need to be coded before the tile of the enhancement layer picture can be coded, means for coding tiles of the base layer picture corresponding to the number of tiles; and means for coding, after coding the tiles of the base layer picture, the tile of the enhancement layer picture.

In another example, a computer-readable storage medium has stored thereon instructions that, when executed, cause a processor to code, for a tile of an enhancement layer picture, data indicating a number of tiles in a base layer picture that need to be coded before the tile of the enhancement layer picture can be coded, code tiles of the base layer picture corresponding to the number of tiles, and, after coding the tiles of the base layer picture, code the tile of the enhancement layer picture.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a conceptual diagram illustrating example tiles in accordance with the High Efficiency Video Coding (HEVC) standard.

FIG. 14 is a conceptual diagram illustrating an enhancement layer picture and a reference layer picture having different numbers of tiles.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. A joint draft of SVC and MVC is described in "Advanced video coding for generic audiovisual services," ITU-T Recommendation H.264, March 2010.

In addition, there is a new video coding standard, namely High-Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). HEVC, also referred to as ITU-T H.265, is described in ITU-T H.265, SERIES H: AUDIOVISUAL AND MULTIMEDIA SYSTEMS, Infrastructure of Audiovisual Services—Coding of Moving Video, High Efficiency Video Coding, April 2013, available at http://www.itu.int/rec/T-REC-H.265-201304-Fen.

Certain details regarding SVC, with respect to both the SVC extension of H.264/AVC and the SVC extension of HEVC, are explained below with respect to FIGS. 4-9.

Existing solutions for parallel processing in multi-layer coding contexts may be associated with at least the following problems:

In HEVC extensions, there may be more inter-dependencies related to different layers in the same access unit or different access units. For example, the decoding of an enhancement layer picture may depend on a decoded reference layer picture. The SVC extension of HEVC (SHVC) employs a multi-loop scalable decoding framework. In the current SHVC framework, all reference layer pictures on which a current layer picture depends (through any type of inter-layer prediction) have to be decoded to start decoding the current layer picture. This may increase the overall codec delay in certain parallel processing architectures for some decoding systems.

In addition, when parallel processing different layers with more than one tile in each layer, up-sampling, inter-layer filtering, or inter-layer syntax prediction for some regions may cross tile boundaries in the reference layer picture. Due to parallel processing with tiles, the availability of reconstructed samples in the reference layer picture along tile boundaries cannot be guaranteed so that the up-sampling or inter-layer filtering cannot be properly performed. Consequently, up-sampling or inter-layer filtering has to be postponed until the whole reference layer picture is decoded or the parallel processing of different layers is partially broken.

Figure 10:
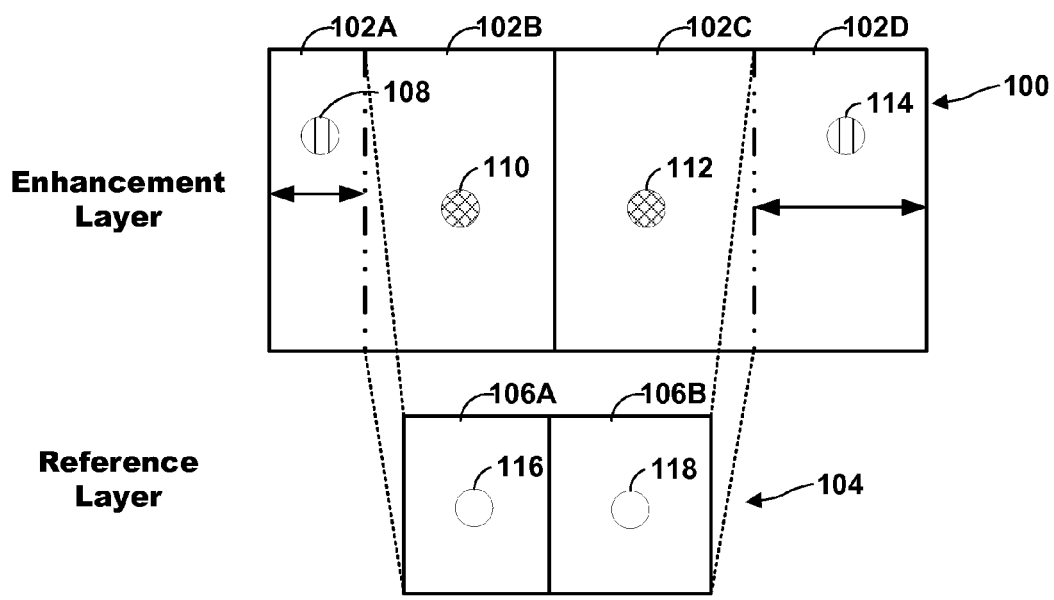
FIG. 10 shows an example of extended spatial scalability where some enhancement layer (EL) samples do not have corresponding base layer samples.
Figure 11:
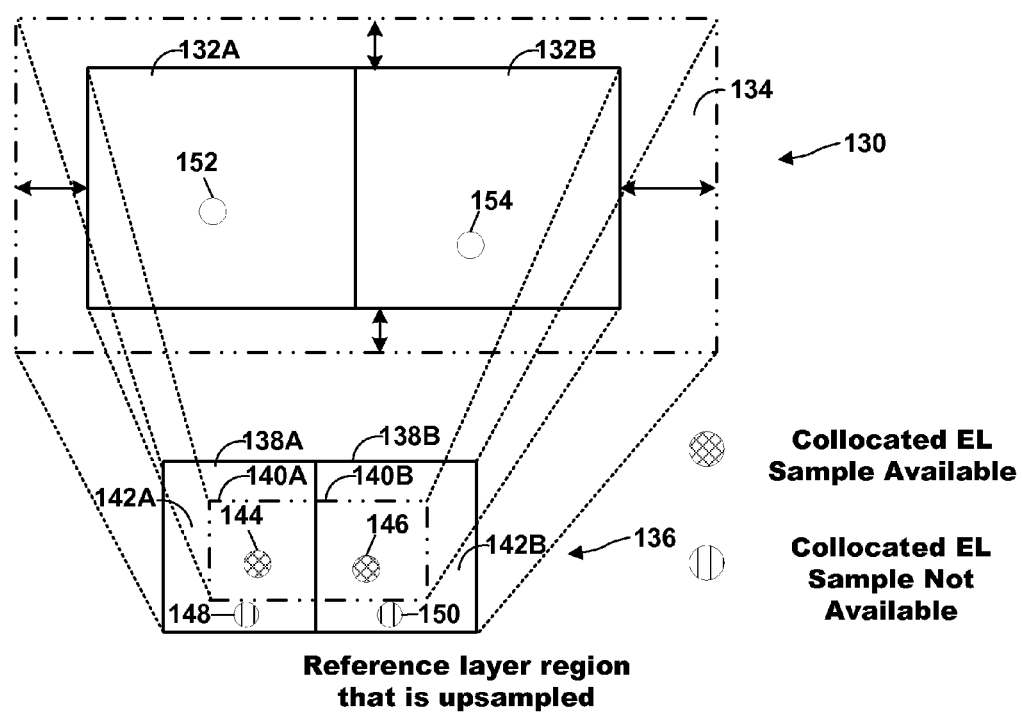
FIG. 11 shows an example of extended spatial scalability where some base layer (BL) samples do not have corresponding enhancement layer samples.

Further, the specification of tile boundary alignment described in K. Sühring, et al., Tile boundary alignment and inter-layer prediction constraints for SHVC and MV-HEVC, JCTVC-M0464, April, 2013 (hereinafter "JCTVC-M0464") is associated with at least the following problems. For the extended spatial scalability or aspect ratio scalability use-case scenarios, an enhancement layer sample may not have a corresponding base layer sample and vice versa. Hence, the specification of tile boundary alignment as described in F. Henry and S. Pateux, "Wavefront parallel processing," JCTVC-E196, March 2011 (hereinafter "JCTVC-E196") may completely disallow usage of tiles across the layers. FIG. 10 shows an example of extended spatial scalability scenario where an enhancement layer sample does not have a corresponding base layer sample. FIG. 11 shows an example of an extended spatial scalability scenario where a base layer sample does not have corresponding enhancement layer sample. JCTVC-M0464 and JCTVC-E196 are hereby incorporated by reference in their entirety.

FIG. 10 shows an example extended spatial scalability where some (enhancement layer) EL samples do not have corresponding base layer samples. FIG. 11 shows an example of extended spatial scalability where some (base layer) BL samples do not have corresponding enhancement layer samples.

This disclosure describes two categories of techniques that may be used to support parallel processing, e.g., in extensions of HEVC. Techniques from these two categories may be used alone or independently. The techniques may apply to scalable video coding, multiview video coding (with or without depth), and other extensions to HEVC and other video codecs. The first category is directed to restricted inter-layer prediction. The second category is directed to signaling. Examples of techniques from both categories are explained in greater detail below.

Figure 1:
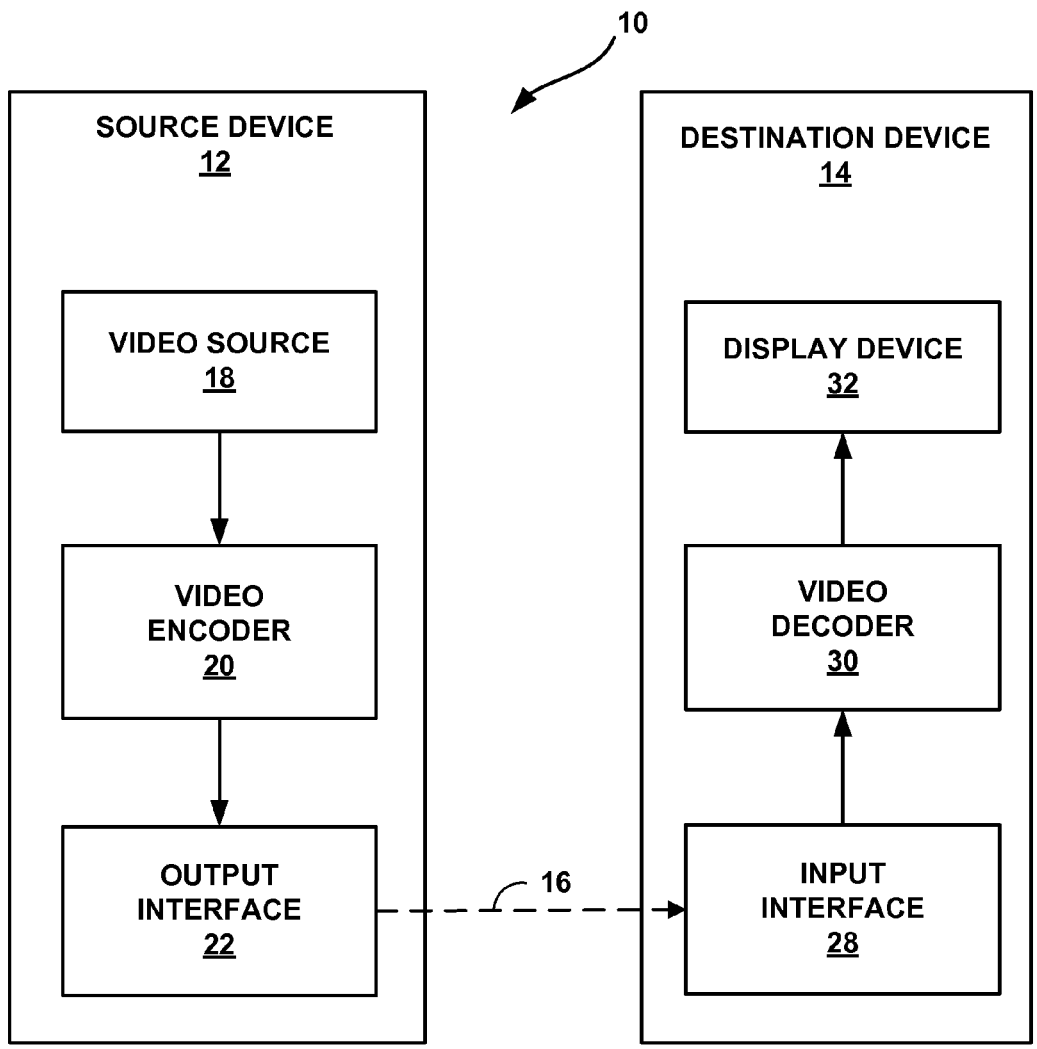
FIG. 1 is a block diagram illustrating an example video encoding and decoding system that may utilize techniques for processing video data in parallel.

FIG. 1 is a block diagram illustrating an example video encoding and decoding system 10 that may utilize techniques for processing video data in parallel. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for processing video data in parallel. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC has developed the HEVC standard and is working on scalable and multi-view extensions to the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, video encoder 20 and/or video decoder 30 may be configured to implement techniques from either or both of the categories discussed above. That is, video encoder 20 and/or video decoder 30 may be configured to perform techniques from the first category (which relates to restricting inter-layer prediction) and from the second category (which relates to signaling).

Several examples of techniques from the first category are explained below. These techniques may be used alone or in any combination, with each other and/or with techniques from the second category.

In a first example of techniques of the first category, tile boundaries of a reference layer and enhancement layers may be aligned. Without loss of generality, FIG. 9 (described below) shows that 4 tiles are used for reference and enhancement layers. In this case, video encoder 20 and/or video decoder 30 may perform coding with 4 processor cores, each of which is dedicated to a respective one of the tiles. To guarantee the parallel processing of the 4 tiles, the up-sampling of inter-layer filtering is not allowed to cross tile boundaries in reference layer. For an enhancement tile, the reference layer collocated samples are regarded as unavailable if the reference layer samples belong to tiles which are not aligned to this enhancement tile. For example, in FIG. 9, when making up-sampling or inter-layer filtering for tile E0, the samples in tile B1 are regarded as unavailable. Consequently, padding may be necessary along the reference layer tile boundaries for up-sampling or inter-layer filtering. Padding refers to filling in values for the pixels on the other side of the tile boundary, e.g., by adding default values to these pixels or extending values of the block along the tile boundary.

In other words, inter-layer prediction may require a degree of up-sampling, which typically utilizes pixels of a base layer tile to generate values for up-sampled pixels to generate a higher resolution predictive tile. In accordance with this first example of the first category, when a block of the enhancement layer corresponds to a block at a tile boundary in the base layer, and when the up-sampling would utilize pixels that cross the tile boundary, video encoder 20 and/or video decoder 30 may instead treat the pixels across the tile boundary as unavailable, and pad values for these pixels.

Similarly, when the tile boundaries of the reference layer and the enhancement layers are aligned, the loop filters, including de-blocking and sample adaptive offset (SAO), are not allowed to cross tile boundaries in reference layer to enable parallel encoding/decoding; this could be fulfilled by restricting the loop_filter_across_tiles_enabled_flag of the reference layer to be zero.

Similarly, in this first example, inter-layer syntax prediction is not allowed to cross tile boundaries in the reference layer. As an example, in an intraBL-based SHVC solution, the reference layer collocated merge or AMVP motion candidate may be marked as unavailable when the collocated block is located in the non-aligned tile. As yet another example, in reference Index (high-level syntax only) based SHVC solutions, motion information of the region near the tile boundary (e.g., within a predefined number of pixels, CUs, PUs, or the like) may be reset or clipped during motion field upsampling/mapping.

As a second example technique in the first category, an encoder constraint is applied so that no CU/PU in an enhancement tile is inter-layer texture predicted or inter-layer syntax predicted from a collocated CU/PU that may have interlayer-filtering or reference layer filtering across the tiles in the reference picture in the same access unit. To indicate this, a video usability information (VUI) flag may be used, as shown in Table 1 below, where italicized text represents additions over the syntax of HEVC:

TABLE 1

| | Descriptor |
|---|---|
| vui_parameters( ) { | |
| ... | |
| bitstream_restriction_flag | u(1) |
| if( bitstream_restriction_flag ) { | |
| tiles_fixed_structure_flag | u(1) |
| inter_layerpred_not_along_tile_boundary_flag | u(1) |
| motion_vectors_over_pic_boundaries_flag | u(1) |
| restricted_ref_pic_lists_flag | u(1) |
| min_spatial_segmentation_idc | ue(v) |
| max_bytes_per_pic_denom | ue(v) |
| max_bits_per_min_cu_denom | ue(v) |
| log2_max_mv_length_horizontal | ue(v) |
| log2_max_mv_length_vertical | ue(v) |
| } | |
| } | |

Thus, Table 1 includes the extra syntax element inter_layerpred_not_along_tile_boundary_flag. The semantics for this syntax element may be defined as follows: inter_layerpred_not_along_tile_boundary_flag equal to 1 indicates that tile boundaries of different layers are aligned and inter-layer texture prediction are not allowed along/across the tile boundaries for the Enhancement layer CU or PU's when the collocated reference layer CU or PU's may have interlayer-filtering or reference layer filtering across the tiles. The inter-layer filtering may also include inter-layer SAO, inter-layer up sampling, inter-layer loop filter, etc. Reference layer filtering may include reference layer SAO, reference layer loop filter, etc. The alignment of tile boundaries means that, for any two enhancement layer picture samples that lie within the same enhancement layer tile, the collocated reference layer samples, if available, shall also lie within the same reference layer tile and for any two reference layer picture samples that lie within the same reference layer tile, the collocated enhancement layer samples, if available, shall also lie within the same enhancement layer tile. The syntax element inter_layerpred_not_along_tile_boundary_flag equal to 0 indicates that there is no restriction on the tile configurations among layers. When inter_layerpred_not_along_tile_boundary_flag is not present in bitstream, it shall be inferred to be equal to 0.

Alternatively, the semantics for this syntax element may be defined as follows: inter_layerpred_not_along_tile_boundary_flag equal to 1 indicates that tile boundaries of different layers are aligned and inter-layer texture prediction and inter-layer syntax prediction are not allowed along/across the tile boundaries such that any enhancement layer tile can be decoded without decoding any non-aligned base layer tile. The alignment of tile boundaries means that for any two enhancement layer picture samples that lie within the same enhancement layer tile, the collocated reference layer samples, if available, shall also lie within the same reference layer tile and for any two reference layer picture samples that lie within the same reference layer tile, the collocated enhancement layer samples, if available, shall also lie within the same enhancement layer tile. The syntax element inter_layerpred_not_along_tile_boundary_flag equal to 0 indicates that there is no restriction on the tile configurations among layers. When inter_layerpred_not_along_tile_boundary_flag is not present in bitstream, it shall be inferred to be equal to 0.

Alternatively, the flag may be signalled in an SEI message that applies to the coded video sequence containing the SEI message with similar semantics.

In other words, when video encoder 20 or video decoder 30 is coding (e.g., encoding or decoding) an enhancement layer block in an enhancement layer tile of an access unit, and when inter-layer filtering or reference layer filtering across tiles in a reference picture of the access unit is enabled, video encoder 20 or video decoder 30 may prevent (e.g., disable) coding of the enhancement layer block using inter-layer texture prediction or inter-layer syntax prediction from a collocated base layer block of the reference picture.

As a third example technique in the first category, in extended spatial scalability, the reference layer and the enhancement layer may have different picture aspect ratios, such as 4:3 for reference layer and 16:9 for enhancement layer. That is, the base layer may include sufficient video data for producing a 4:3 aspect ratio video, whereas the enhancement layer may include sufficient video data for producing a 16:9 aspect ratio video. In this case, there may be a big enhancement layer region which has no counterpart in the reference layer so that no inter-layer prediction can be made for such regions (namely, the region in the enhancement layer pictures that lies outside of the 4:3 aspect ratio region of the base layer). When such regions (in the enhancement layer pictures that lie outside of the 4:3 aspect ratio region of the base layer) and regions which can be inter-layer predicted are coded in different tiles, better parallel processing among layers may be obtained.

To indicate this in bitstream, a new SEI message, named tile inter-layer prediction information SEI message in the example of, with the following syntax and semantics described with respect to Table 2, may be coded:

TABLE 2

| | Descriptor |
|---|---|
| tile_interlayer_pred_info( payloadSize ) { | |
|   sei_pic_parameter_set_id | ue(v) |
|   for( i = 0; i <= num_tile_columns_minus1; i++ ) | |
|     for( j = 0; j <= num_tile_rows_minus1; j++ ) | |
|       non_interlayer_pred_flag[ i ][ j ] | u(1) |
| } | |

In this example, sei_pic_parameter_set_id specifies the value of pps_pic_parameter_set for the PPS that is referred to by the picture associated with the tile inter-layer prediction information SEI message. The value of sei_pic_parameter_set_id shall be in the range of 0 to 63, inclusive.

Alternatively, sei_pic_parameter_set_id may be fixed-length coded, e.g., as u(6), instead of coded as ue(v).

In this example, non_interlayer_pred_flag[i][j] equal to 1 indicates that no inter-layer prediction of texture or syntax is used for the tile in the i-th the column and the j-th the row. non_interlayer_pred_flag[i][j] equal to 0 indicates that inter-layer prediction of texture or syntax may be used for the tile in the i-th the column and the j-th the row.

As a fourth example technique in the first category, in the 13$^{th}$ JCTVC meeting in Incheon Korea, tile boundary alignment flag has been adopted as in JCTVC-M0464 for HEVC extensions. The below technique, more specifically, is related to tile boundary alignment for extended spatial scalability and aspect ratio scalability use-case scenarios.

In this example, the semantics of tile boundary alignment flag is modified as follows, where bracketed text preceded by "removed" indicates deletions from the previous definition: tile_boundaries_aligned_flag equal to 1 indicates that [removed: "all tile boundaries of the corresponding base layer picture have corresponding tile boundaries in the given enhancement layer and there exist no additional tile boundaries in the enhancement layer. That means,"] for any two enhancement layer picture samples that lie within the same enhancement layer tile, the collocated reference layer samples, if available, shall also lie within the same reference layer tile and for any two reference layer picture samples that lie within the same reference layer tile, the collocated enhancement layer samples, if available, shall also lie within the same enhancement layer tile. tile_boundaries_aligned_flag equal to 0 indicates that there is no restriction on the tile configuration between the corresponding enhancement layer and the given reference layer.

Also, it may be noted that, for extended spatial scalability cases, there might be additional tile boundaries in the enhancement layer compared to the reference layer and also alternatively there might be additional tile boundaries in the reference layer compared to the enhancement layer.

As a fifth example technique in the first category, alternatively, a tile boundary alignment flag may be normatively constrained to zero for extended scalability or aspect ratio scalability use cases. In this example, the following constraint is added to tile_boundaries_aligned_flag:tile_boundaries_aligned_flag shall be equal to zero when extended_spatial_scalability_idc is greater than zero. Alternatively, tile_boundaries_aligned_flag shall be equal to zero when at least one of the geometrical parameters for the resampling process have non-zero value. The geometrical parameters include scaled_ref_layer_left_offset, scaled_ref_layer_top_offset, scaled_ref_layer_right_offset, scaled_ref_layer_bottom_offset.

The second category of techniques relates to signaling for parallel processing. SHVC employs the multi-loop scalable decoding framework, where all reference layer pictures that the current layer picture depends on (though any type of inter-layer prediction) have to be decoded to start decoding the current layer picture. However, decoders may process different layers in parallel. It may be beneficial if a decoder thread for an enhancement layer can start to decode as soon as decoding of partial region of a reference layer picture is completed. This partial decoding of a reference layer picture may correspond to one or more tiles.

It may also be noted that smaller tiles may increase parallelism, but at the same time reduce the coding efficiency, and vice versa. So, for the spatial scalability case, enhancement and reference layer pictures might use different tile structures. In this case, it may be desirable for the decoder to have information defining the maximum number of tiles in a reference layer picture that need to be decoded before starting to decode an enhancement layer tile, e.g., to enable further overall codec delay reduction.

In a first example technique of the second category, video encoder 20 may signal, and video decoder 30 may receive, such a value using a new syntax element associated with each tile in an enhancement layer, e.g., named max_ref_tile_dec_idc_minus1[i]. The semantics for this syntax element may be as follows: max_ref_tile_dec_idc_minus1[i] plus 1 indicates the maximum number of corresponding tiles in a reference layer picture of the current layer picture that need to be decoded before the current tile can be decoded.

Video decoder 30 may derive the corresponding tiles as consecutive tiles based on the tile scan order of the reference layer picture. The syntax element can be signaled in the video parameter set (VPS), sequence parameter set (SPS), picture parameter set (PPS), slice header, video usability information (VUI), or as a supplemental enhancement information (SEI) message, or other syntax structures, preferably conditioned based on tile_enable_flag, and not signalled for an layer picture with nuh_layer_id equal to 0.

In a second example technique of the second category (which expand upon the first example technique of the second category), video encoder 20 may signal, and video decoder 30 may receive, a value using a new syntax element associated with each tile in an enhancement layer and for each reference layer picture that the current enhancement layer picture depends on, e.g., named max_ref_tile_dec_idc_minus1[i][j]. The semantics for this syntax element may be as follows: max_ref_tile_dec_idc_minus1[i][j] plus 1 indicates the maximum number of corresponding tiles in a $j^{th}$ reference layer picture of the current layer picture that need to be decoded before the $i^{th}$ current tile can be decoded.

Video decoder 30 may derive the corresponding tiles as consecutive tiles based on the tile scan order of the reference layer picture. The syntax element can be signaled in the VPS, SPS, PPS, slice header, VUI or an SEI message, or other syntax structures, preferably conditioned based on tile_enable_flag, and not signalled for a layer picture with nuh_layer_id equal to 0.

In a third example technique of the second category (which may expand upon the first example technique in the second category), the corresponding tiles of an enhancement layer tile may also be indicated by explicitly signaling the tile IDs of the corresponding tiles in the bit-stream, e.g., in the VPS, SPS, PPS, slice header, VUI or an SEI message, or other syntax structures.

In a fourth example technique of the second category (which may expand upon the first and/or second example techniques in the second category), the tile scanning process at the reference layer may be signaled for an enhancement layer to enable an arbitrary tile scanning process.

A fifth example technique of the second category relates to inter-layer filtering across a tile boundary. Similar to the flag loop_filter_across_tiles_enabled_flag defined in the HEVC draft, to enable improved parallel processing across tiles from different layers, it is proposed to define a flag, e.g., called interlayer_filter_across_tiles_enabled_flag, with the following semantics: interlayer_filter_across_tiles_enabled_flag equal to 1 specifies that inter-layer filtering operations are performed across reference layer tile boundaries. interlayer_filter_across_tiles_enabled_flag equal to 0 specifies that inter-layer filtering operations are not performed across tile boundaries. The inter-layer filtering operations may include interlayer SAO, Inter layer ALF and/or upsampling. The flag can be signaled in the VPS, SPS, PPS, slice header, or other syntax structures.

A sixth example technique of the second category relates to inter-layer prediction across a tile boundary. In this sixth example technique, it is proposed to define a flag, e.g., called interlayer_pred_across_tiles_enabled_flag, with the following semantics: interlayer_pred_across_tiles_enabled_flag equal to 1 specifies that inter-layer prediction operations are performed across reference layer tile boundaries. interlayer_pred_across_tiles_enabled_flag equal to 0 specifies that inter-layer filtering operations are not performed across tile boundaries. The inter-layer prediction may include prediction of texture, motion, syntax or residues. The flag can be signaled in the VPS, SPS, PPS, slice header, or other syntax structures.

This disclosure also describes techniques related to tile-based up-sampling. Video encoder 20 and/or video decoder 30 may be configured to perform the tile-based up-sampling techniques of this disclosure. In practice, it may not be preferred that up-sampling is disallowed along and/or across tile boundaries. That is, it may be preferable to allow for up-sampling along and/or across tile boundaries, in accordance with the techniques of this disclosure.

As an example, video encoder 20 and video decoder 30 may code a syntax element (e.g., a flag in an SPS, PPS, or VPS, for one or more enhancement layers) indicating whether tile based up-sampling is enabled (e.g., for a corresponding enhancement layer). For example, the syntax shown in Table 3 below may be signaled in an SPS, where the italicized syntax element represents an addition with respect to the conventional syntax for the SPS:

TABLE 3

| if( sps_extension_flag ) { | |
| --- | --- |
| ... | |
| resampling_filter_across_tiles_enabled_flag | u(1) |
| ... | |

Semantics for this syntax element may be defined as follows: resampling_filter_across_tiles_enabled_flag equal to 0 specifies that picture based up-sampling is enabled. Resampling_filter_across_tiles_enabled_flag equal to 1 specifies that tile based up-sampling is enabled.

When tile based up-sampling is enabled, video encoder 20 and video decoder 30 may treat tile boundaries in the same way as that of picture boundaries in the up-sampling process. That is, when a pixel sample outside the current tile (which may be inside or outside the current picture) is needed for up-sampling, video encoder 20 and video decoder 30 may generate a value for the pixel with pixel padding from those pixels inside the current tile. The padding process may be the same as that defined for pixels outside the current picture, e.g., by HEVC.

Similar principles can be applied to inter-layer filtering also. The inter-layer filtering operations may include inter-layer ALF and/or smoothing filter for SNR, and the like. Table 4 below represents an example of syntax data indicative of whether inter-layer filtering operations are enabled, where italicized text represents additions to the previous version of the proposed standard.

TABLE 4

| if( sps_extension_flag ) { | |
| --- | --- |
| ... | |
| inter_layer_filter_across_tiles_enabled_flag | u(1) |
| ... | |

Semantics for this syntax element may be defined as follows: inter_layer_filter_across_tiles_enabled_flag equal to 0 specifies that picture based inter-layer filtering is enabled. Inter_layer_filter_across_tiles_enabled_flag equal to 1 specifies that tile based inter-layer filtering is enabled. When not present (e.g., in an SPS), video decoder 30 may infer the value of inter_layer_filter_across_tiles_enabled_flag to be equal to 0. Similar to the tile based upsampling process, when tile based inter-layer filtering is enabled, video encoder 20 and video decoder 30 may treat tile boundaries in the same way as picture boundaries in inter-layer filtering process.

This disclosure also describes techniques for up-sampling using reconstructed pixels before SAO and de-blocking filters around slice and/or tile boundaries. In a PPS, loop_filter_across_tiles_enabled_flag equal to 1 may specify that in-loop filtering operations may be performed across tile boundaries in pictures referring to the PPS. Loop_filter_across_tiles_enabled_flag equal to 0 may specify that in-loop filtering operations are not performed across tile boundaries in pictures referring to the PPS. The in-loop filtering operations may include deblocking filter and sample adaptive offset filter operations. When not present, the value of loop_filter_across_tiles_enabled_flag may be inferred to be equal to 1.

In some examples, video encoder 20 and video decoder 30 may code a syntax element (e.g., a flag in an SPS or VPS, for each enhancement layer) that indicates whether tile based up-sampling is performed using the reconstructed pixels before (or after) a reference layer loop filtering process is performed. Table 5 represents an example of syntax data that may be signaled in an SPS, indicative of whether tile based up-sampling is performed using the reconstructed pixels before reference layer loop filtering process, where italicized text represents additions proposed by this disclosure to the previous version of the proposed standard.

TABLE 5

| if( sps_extension_flag ) { | |
| --- | --- |
| ... | |
| if( loop_filter_across_tiles_enabled_flag ) | |
| resampling_filter_before_loop_filter_across_tiles_enabled_flag | u(1) |
| ... | |

Semantics for this syntax element may be defined as follows: resampling_filter_before_loop_filter_across_tiles_enabled_flag equal to 0 specifies that tile based up-sampling uses the reconstructed pixels before reference layer loop filtering process. Resampling_filter_across_tiles_enabled_flag equal to 1 specifies that tile based up-sampling uses the reconstructed pixels after the reference layer loop filtering. When not present, video decoder 30 may infer the value of resampling_filter_across_tiles_enabled_flag to be equal to 1. Similar principles can be applied to inter-layer filtering. Likewise, similar principles can be applied to slice boundaries, in addition to or in the alternative to tile boundaries. The term "sub-picture unit" may refer to a slice, tile, wavefront, row of CTUs, or other such unit that is smaller than a full picture and includes a plurality of CTUs. Thus, the techniques above may be described as techniques for coding data that indicates whether sub-picture-unit-based up-sampling is performed using reconstructed pixels before a reference layer loop filtering process is performed.

This disclosure also describes techniques related to wavefront parallel processing (WPP) based up-sampling. In practice, for low delay applications using WPP, it is not preferred that up-sampling (or smooth filtering for SNR case) is disallowed along/across vertical CTU boundaries. That is, it may be desirable to allow up-sampling (or smooth filtering) across/along vertical CTU boundaries. As one implementation example, video encoder 20 and video decoder 30 may be configured to use padding to avoid using data from down and right CTUs when performing inter layer filtering. This implementation only requires that the reference layer CTU be coded before the enhancement layer CTU.

In accordance with the techniques of this disclosure, video encoder 20 and video decoder 30 may be configured to code a syntax element (e.g., a flag in an SPS or VPS, for each enhancement layer) that indicates whether WPP-based inter-layer filtering is enabled. For example, video encoder 20 and video decoder 30 may code syntax data in an SPS in accordance with Table 6 below, where italicized text represents additions proposed by this disclosure.

TABLE 6

| if( sps_extension_flag ) { | |
| --- | --- |
| ... | |
| if( entropy_coding_sync_enabled_flag ) | |
| resampling_filter_across_wpps_enabled_flag | u(1) |
| ... | |

Semantics for this syntax element may be defined as follows: resampling_filter_across_wpps_enabled_flag equal to 0 specifies that picture based up-sampling is enabled. resampling_filter_across_wpps_enabled_flag equal to 1 specifies that CTU row based up-sampling is enabled. When not present, video decoder 30 may infer the value of resampling_filter_across_wpps_enabled_flag to be equal to 0.

When CTU row based up-sampling is enabled, video encoder 20 and video decoder 30 may treat CTU row boundaries in the same way as that of picture boundaries in an up-sampling process. That is, when a pixel sample outside the current CTU row (which may be inside or outside the current picture) is needed for up-sampling, video encoder 20 and video decoder 30 may generate a value for the pixel with pixel padding from those pixels inside the current CTU row. The padding process may be the same as that defined for pixels outside the current picture, e.g., in accordance with HEVC.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/ prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
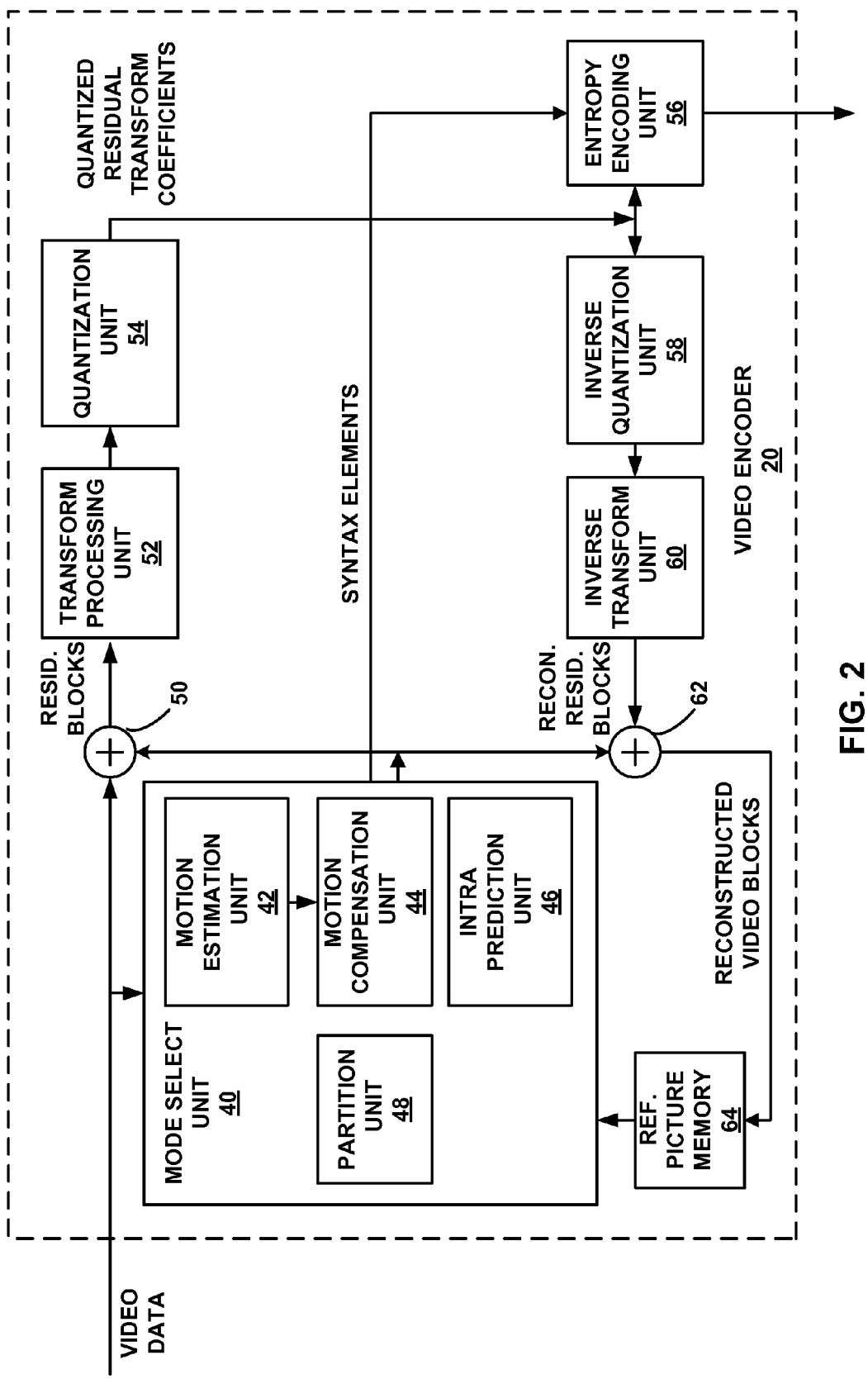
FIG. 2 is a block diagram illustrating an example of a video encoder that may implement techniques for processing video data in parallel.

FIG. 2 is a block diagram illustrating an example of video encoder 20 that may implement techniques for processing video data in parallel. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as code-word mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Reference picture memory 64 may implement or include a decoded picture buffer (DPB). Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Video encoder 20 represents an example of a video encoder that may be configured to perform any of the techniques of this disclosure, alone or in any combination. For instance, video encoder 20 may be configured to determine whether a reference layer picture has filtering across tile boundaries enabled, and if so, disable inter-layer prediction for an enhancement layer picture from the reference layer picture. Additionally or alternatively, video encoder 20 may be configured to encode a reference layer picture, and substantially in parallel, an enhancement layer picture having a larger aspect ratio, where video encoder 20 may encode overlapping portions of the enhancement layer picture using inter-layer prediction and non-overlapping portions of the enhancement layer picture without using inter-layer prediction. Additionally or alternatively, video encoder 20 may encode a syntax element indicating whether tile boundaries for an enhancement layer are aligned with tile boundaries of a reference layer picture, and encode the enhancement layer picture based on the syntax element. That is, video encoder 20 may disable inter-layer prediction if the tile boundaries are not aligned, but enable inter-layer prediction if the tile boundaries are aligned. Additionally or alternatively, video encoder 20 may encode a syntax element for an enhancement layer tile indicating a number of reference layer tiles to be encoded before the enhancement layer tile can be encoded, and then after encoding that number of reference layer tiles, encode the enhancement layer tile. Any or all of these various encoding operations may be performed in parallel with other encoding operations, with the restriction that reference layer tiles used for inter-layer prediction for encoding an enhancement layer tile are encoded before the enhancement layer tile is encoded.

Figure 3:
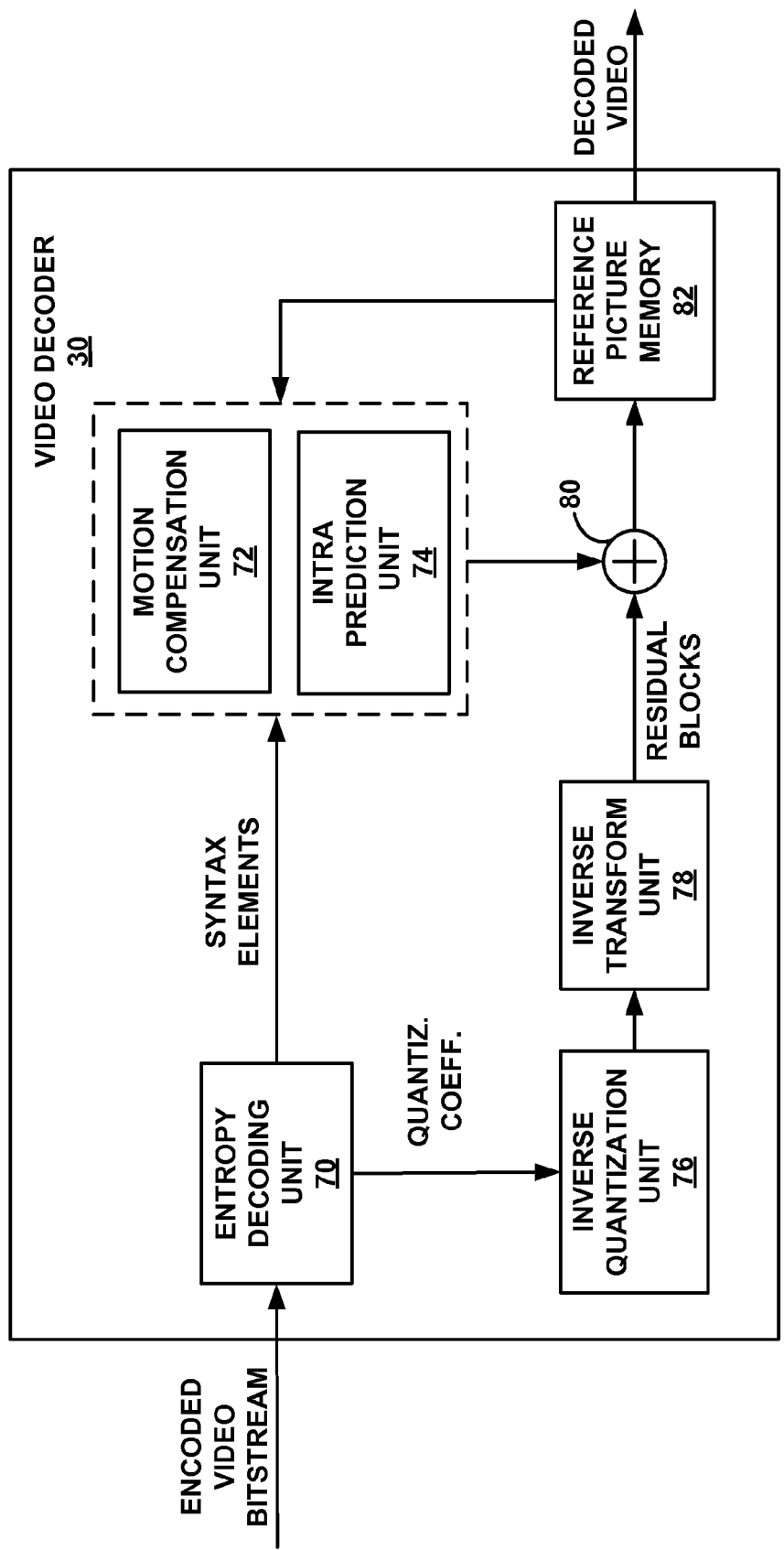
FIG. 3 is a block diagram illustrating an example of a video decoder that may implement techniques for processing video data in parallel.

FIG. 3 is a block diagram illustrating an example of video decoder 30 that may implement techniques for processing video data in parallel. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Reference picture memory 82 may implement or include a decoded picture buffer (DPB). Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Video decoder 30 may be configured to perform any or all of the techniques of this disclosure, alone or in any combination. For instance, video decoder 30 may be configured to determine whether a reference layer picture has filtering across tile boundaries enabled, and if so, disable inter-layer prediction for an enhancement layer picture from the reference layer picture. Additionally or alternatively, video decoder 30 may be configured to decode a reference layer picture, and substantially in parallel, an enhancement layer picture having a larger aspect ratio than the reference layer picture, where video decoder 30 may decode overlapping portions of the enhancement layer picture using inter-layer prediction and non-overlapping portions of the enhancement layer picture without using inter-layer prediction. Additionally or alternatively, video decoder 30 may decode a syntax element indicating whether tile boundaries for an enhancement layer are aligned with tile boundaries of a reference layer picture, and decode the enhancement layer picture based on the syntax element. That is, video decoder 30 may disable inter-layer prediction if the tile boundaries are not aligned, but enable inter-layer prediction if the tile boundaries are aligned. Additionally or alternatively, video decoder 30 may decode a syntax element for an enhancement layer tile indicating a number of reference layer tiles to be decoded before the enhancement layer tile can be decoded, and then after decoding that number of reference layer tiles, decode the enhancement layer tile. Any or all of these various decoding operations may be performed in parallel with other decoding operations, with the restriction that reference layer tiles used for inter-layer prediction for decoding an enhancement layer tile are decoded before the enhancement layer tile is decoded.

Figure 4:
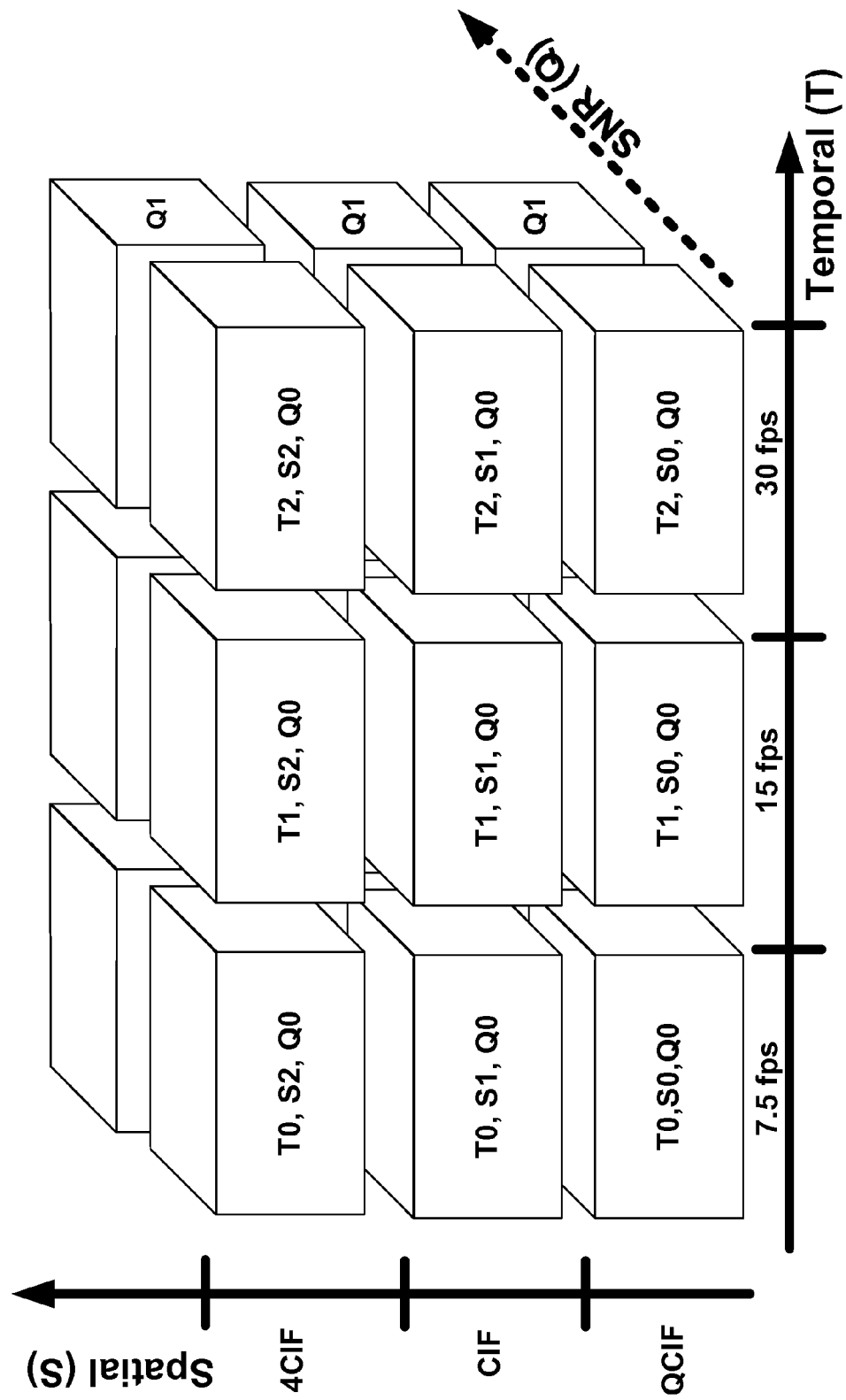
FIG. 4 is a conceptual diagram illustrating various scalable dimensions for scalable video coding (SVC).

FIG. 4 is a conceptual diagram illustrating various scalable dimensions for scalable video coding (SVC). FIG. 4 illustrates an example of the scalability structure of SVC. In particular, an example of scalabilities in different dimensions is shown in FIG. 4. In this example, scalabilities are enabled in three dimensions. In the time dimension, frame rates with 7.5 Hz, 15 Hz or 30 Hz can be supported by temporal scalability (T). When spatial scalability (S) is supported, different resolutions, such as QCIF, CIF, and 4CIF, may be enabled. For each specific spatial resolution and frame rate, signal-to-noise (SNR) (Q) layers can be added to improve the picture quality.

Once video content has been encoded in such a scalable way, an extractor tool may be used to adapt the actual delivered content according to application requirements, which may be dependent, e.g., on the clients or the transmission channel. In the example shown in FIG. 4, each cubic volume, i.e., cube, contains the pictures with the same frame rate (temporal level), spatial resolution and SNR layers. Better representation can be achieved by adding those cubes (pictures) in any dimension. Combined scalability may be supported when there are two, three or even more scalabilities enabled.

According to the SVC specification, the pictures with the lowest spatial and quality layer are compatible with H.264/AVC, and the pictures at the lowest temporal level form the temporal base layer, which can be enhanced with pictures at higher temporal levels. In addition to the H.264/AVC compatible layer, several spatial and/or SNR enhancement layers can be added to provide spatial and/or quality scalabilities. SNR scalability is also referred to as quality scalability. Each spatial or SNR enhancement layer itself may be temporally scalable, with the same temporal scalability structure as the H.264/AVC compatible layer. For one spatial or SNR enhancement layer, the lower layer it depends on is also referred to as the base layer of that specific spatial or SNR enhancement layer.

Figure 5:
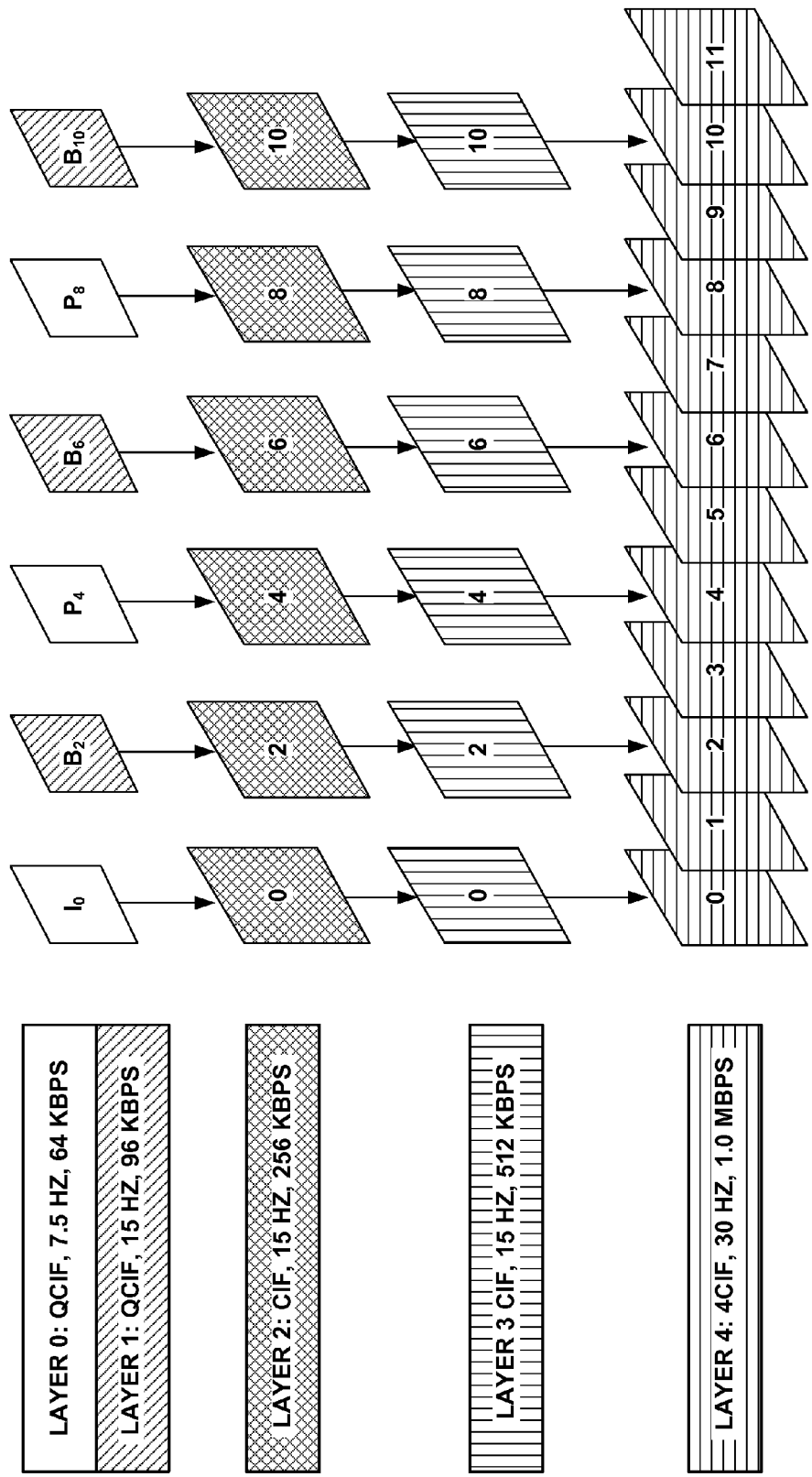
FIG. 5 is a conceptual diagram illustrating an example of the SVC coding structure.

FIG. 5 is a conceptual diagram illustrating an example of the SVC coding structure. In this example, the pictures with the lowest spatial and quality layer (pictures in layer 0 and layer 1, with QCIF resolution) are compatible with H.264/AVC. Among them, those pictures of the lowest temporal level form the temporal base layer, as shown in layer 0 of FIG. 5. This temporal base layer (layer 0) can be enhanced with pictures of higher temporal levels (layer 1). In addition to the H.264/AVC compatible layer, several spatial and/or SNR enhancement layers can be added to provide spatial and/or quality scalabilities. For instance, the enhancement layer can be a CIF representation with the same resolution as layer 2. In this example, layer 3 is a SNR enhancement layer. As shown in this example, each spatial or SNR enhancement layer itself may be temporally scalable, with the same temporal scalability structure as the H.264/AVC compatible layer. Also, an enhancement layer can enhance both spatial resolution and frame rate. For example, layer 4 provides a 4CIF enhancement layer, which further increases the frame rate from 15 Hz to 30 Hz.

Figure 6:
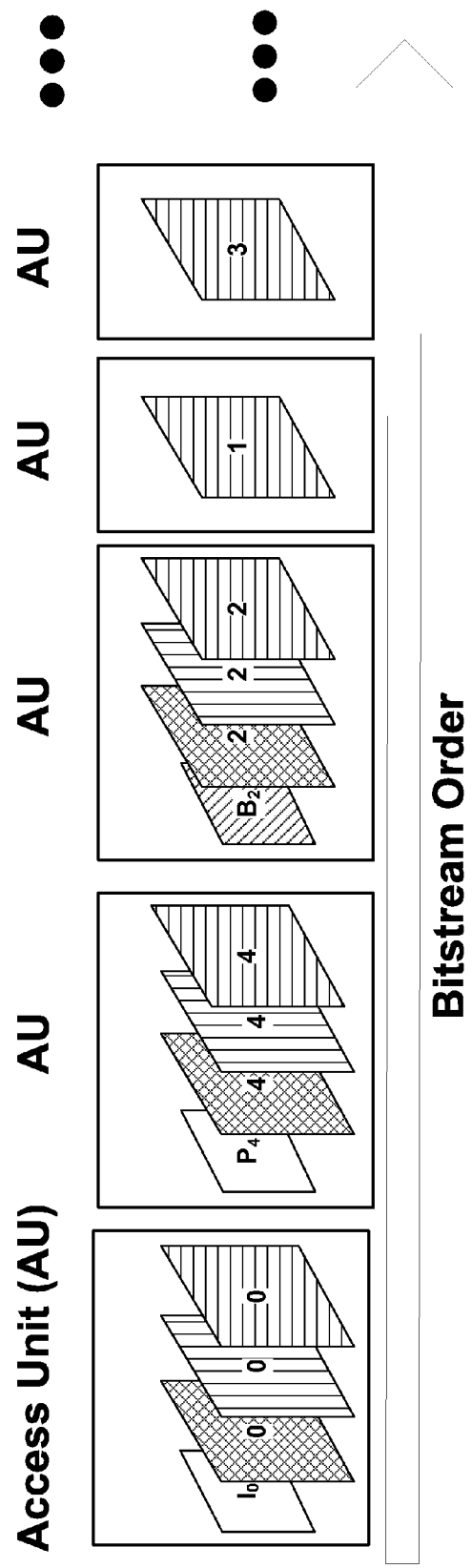
FIG. 6 is a conceptual diagram illustrating example access units (AUs).

FIG. 6 is a conceptual diagram illustrating example access units (AUs). Each AU includes one or more slices, encapsulated within network abstraction layer (NAL) units. There may be zero or more NAL units per access unit per layer. A set of NAL units corresponding to one layer within one access unit may be referred to as a "layer component." The example of FIG. 6 portrays layer components corresponding to the layer components of FIG. 5. As shown in the example of FIG. 6, the coded slices in the same time instance (i.e., within a common AU) are successive in the bitstream order and form one access unit in the context of SVC. Those SVC access units then follow the decoding order, which could be different from the display order and decided, e.g., by the temporal prediction relationship.

Scalable extensions of H.264/AVC (Advanced Video Coding) are described below. Some functionalities of SVC are inherited from H.264/AVC. Compared with previous scalable standards, some of the greatest advantages of the SVC extension to H.264/AVC, namely inter-layer prediction and single-loop decoding, are reviewed below.

The SVC extension of H.264/AVC supports single loop decoding. To keep a low-complexity decoder, single-loop decoding is mandatory in SVC. With single-loop decoding, each supported layer can be decoded with a single motion compensation loop. To achieve this, the usage of inter-layer intra-prediction is only allowed for enhancement layer macro blocks, for which the co-located reference layer signal is intra-coded. It is further required that all layers that are used to inter-layer predict higher layers are coded using constrained intra-prediction.

The SVC extension of H.264/AVC also supports inter-layer prediction. SVC introduces inter-layer prediction for spatial and SNR scalabilities based on texture, residue and motion. Spatial scalability in SVC has been generalized to any resolution ratio between two layers. SNR scalability can be realized by Coarse Granularity Scalability (CGS) or Medium Granularity Scalability (MGS). In SVC, two spatial or CGS layers belong to different dependency layers (indicated by dependency_id in NAL unit header), while two MGS layers can be in the same dependency layer. One dependency layer includes quality layers with quality_id from 0 to higher values, corresponding to quality enhancement layers. In SVC, inter-layer prediction methods are utilized to reduce inter-layer redundancy. They are briefly introduced in the following paragraphs.

The coding mode using inter-layer intra prediction is called "IntraBL" mode in SVC. To enable single-loop decoding, only the macroblocks (MBs), which have co-located MBs in the base layer coded as constrained intra modes, can use inter-layer intra prediction mode. A constrained intra mode MB is intra-coded without referring to any samples from neighboring inter-coded MBs.

If an MB is indicated to use residual prediction, the co-located MB in the base layer for inter-layer prediction must be an inter MB and its residue may be up-sampled according to the spatial resolution ratio. The residue difference between the enhancement layer and that of the base layer is coded. That is, the reconstruction of the current frame $\hat{I}_e$ of the enhancement layer equals the sum of de-quantized coefficients $r_e$ of the enhancement layer, the temporal prediction $P_e$ from the enhancement layer, and the quantization normalized residual coefficients $r_b$ of the base layer.

$$\hat{I}_e = r_e + P_e + r_b \quad (1)$$

The co-located base layer motion vectors may be scaled to generate predictors for the motion vectors of MB or MB partition in the enhancement layer. In addition, there is one MB type named base mode, which sends one flag for each MB. If this flag is true and the corresponding base layer MB is not intra, then motion vectors, partitioning modes and reference indices are all derived from base layer.

FIG. 7 is a conceptual diagram illustrating example tiles in accordance with the High Efficiency Video Coding (HEVC) standard. HEVC contains several proposals to make the codec more parallel-friendly, including tiles and Wavefront parallel processing (WPP). HEVC defines tiles as an integer number of coding tree blocks co-occurring in one column and one row, ordered consecutively in coding tree block raster scan of the tile. The division of each picture into tiles is referred to as a partitioning in HEVC. Tiles in a picture are ordered consecutively in tile raster scan of the picture as shown in FIG. 7.

The number of tiles and the location of their boundaries can be defined for the entire sequence or changed from picture to picture. Tile boundaries, similarly to slice boundaries, break parse and prediction dependences so that a tile can be processed independently, but the in-loop filters (de-blocking and SAO) can still cross tile boundaries. HEVC also specifies some constraints on the relationship between slices and tiles.

One advantage of using tiles is that that they do not require communication between processors for entropy decoding and motion compensation reconstruction, but communication may be needed if loop_filter_across_tiles_enabled_flag is set to 1.

Compared to slices, tiles typically have a better coding efficiency, because tiles allow picture partition shapes that contain samples with a potential higher correlation than slices, and also because tiles reduce slice header overhead.

The tile design in HEVC may provide the following benefits: 1) enabling parallel processing, and 2) improving coding efficiency by allowing a changed decoding order of coding tree units (CTUs) compared to the use of slices, while the main benefit is the first one. When a tile is used in single-layer coding, the syntax element min_spatial_segmentation_idc may be used by a decoder to calculate the maximum number of luma samples to be processed by one processing thread, making the assumption that the decoder maximally utilizes the parallel decoding information. In HEVC, there may be same picture inter-dependencies between the different threads, e.g., due to entropy coding synchronization or de-blocking filtering across tile or slice boundaries. The HEVC standard includes a note which encourages encoders to set the value of min_spatial_segmentation_idc to be the highest possible value.

Figure 8:
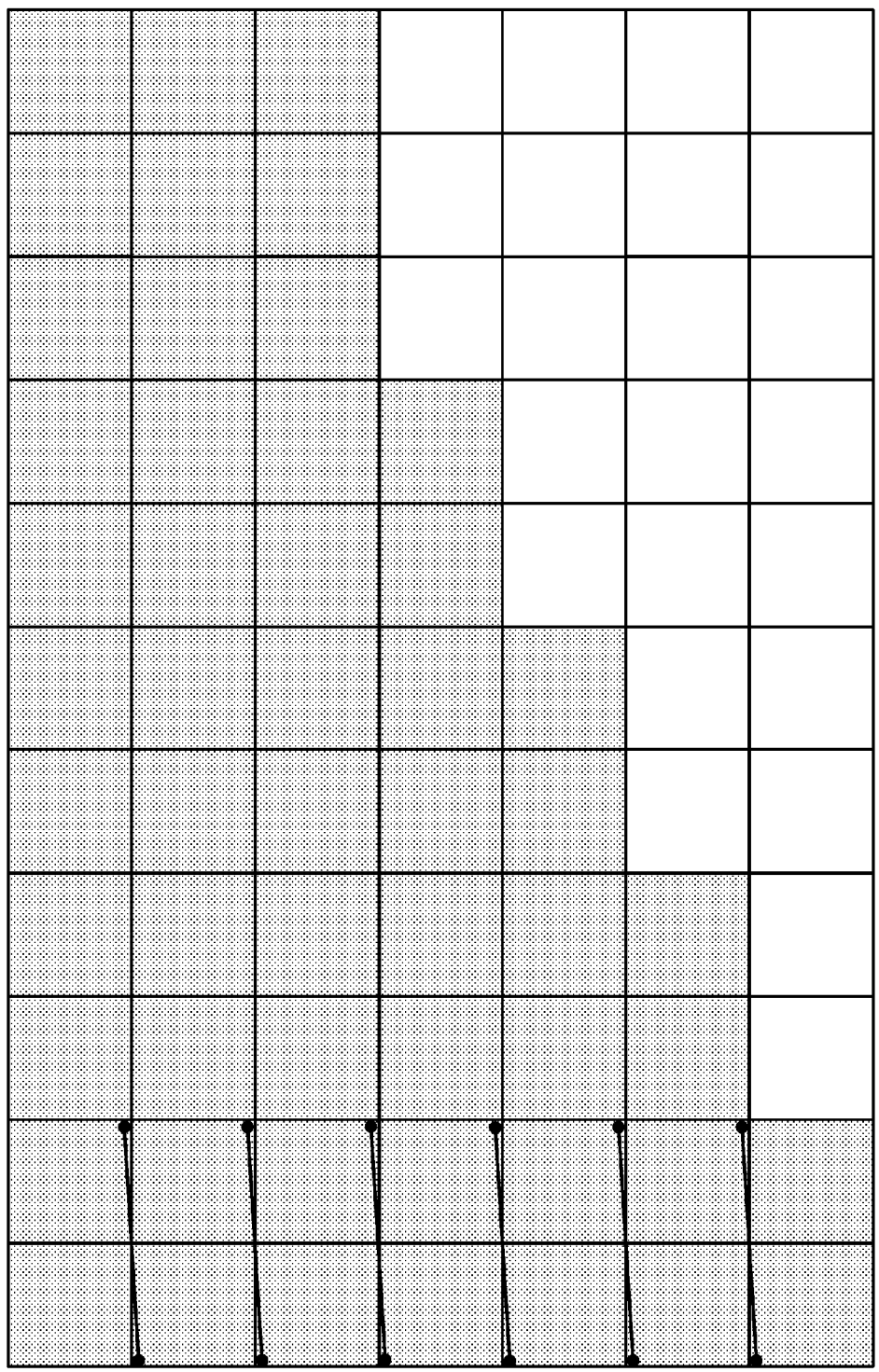
FIG. 8 is a conceptual diagram illustrating wavefronts for wavefront parallel processing (WPP).

FIG. 8 is a conceptual diagram illustrating wavefronts for wavefront parallel processing (WPP). HEVC defines a WPP technique. When WPP is enabled, each CTU row of a picture is a separated partition. Compared to slices and tiles, however, no coding dependences are broken at CTU row boundaries. Additionally, CABAC probabilities are propagated from the second CTU of the previous row, to further reduce the coding losses. Also, WPP does not change the regular raster scan order. Because dependences are not broken, the rate-distortion loss of a WPP bitstream is small, compared to a nonparallel bitstream.

When WPP is enabled, a number of processors up to the number of CTU rows can work in parallel to process the CTU row (or lines). The wavefront dependences, however, do not allow all the CTU rows to start decoding at the beginning of the picture. Consequently, the CTU rows also cannot finish decoding at the same time at the end of the picture. This introduces parallelization inefficiencies that become more evident when a high number of processors are used.

FIG. 8 illustrates how WPP processes rows of CTBs in parallel, each row starting with the CABAC probabilities available after processing the second CTB of the row above.

Similar to H.264/AVC, HEVC will also have scalable video coding extension, currently called Scalable High efficiency Video Coding (SHVC), which will at least provide temporal scalability, SNR scalability and spatial scalability. The call for proposal was released in July 2012. The first version of the SHVC working draft and test model will be available in March 2013.

In SHVC, to achieve inter-layer texture prediction, the reference layer reconstructed samples are first up-sampled when the resolution of the reference layer is lower than that of the enhancement layer. Even in the SNR scalability case, the reference layer samples may be filtered before being used for inter-layer prediction to obtain higher coding efficiency. Currently, the up-sampling or inter-layer filtering process is performed for whole layer pictures, which may also be referred to as layer components or simply pictures.

In SHVC, the multi-loop decoding structure is used. Decoders may process different layers in parallel. To ease parallel processing, F. Henry and S. Pateux, "Wavefront parallel processing," JCTVC-E196, March 2011 proposed to indicate that the tile boundaries of all reference layers are aligned with tile boundaries of that enhancement layer. The alignment of tile boundaries of different layers is first specified such that for any two enhancement layer picture samples that lie within the same enhancement layer tile, the collocated base layer samples shall also lie within the same base layer tile.

In SHVC, the multi-loop decoding structure is used. Decoders may process different layers in parallel. To ease parallel processing, it has been proposed to indicate that the tile boundaries of all reference layers are aligned with tile boundaries of that enhancement layer. The syntax and semantics of alignment of tile boundaries and alignment of different layers is specified in Table 7 below, which illustrates modifications to a table described in K. Sühring, R. Skupin, T. Schierl, Indication of tile boundary alignment, JCTVC-L0197, January 2013 and JCTVC-M0464, mentioned above, where italicized text represents proposed additions.

TABLE 7

|  | Descriptor |
| --- | --- |
| vui_parameters( ) { | |
|     aspect_ratio_info_present_flag | u(1) |
|     ... | |
|     if( bitstream_restriction_flag ) { | |
|         tiles_fixed_structure_flag | u(1) |
|         if ( nuh_layer_id > 0 ) | |
|             tile_boundaries_ aligned_flag | u(1) |
|         motion_vectors_over_pic_boundaries_flag | u(1) |
|         restricted_ref_pic_lists_flag | u(1) |
|         min_spatial_segmentation_idc | u(8) |
|         max_bytes_per_pic_denom | ue(v) |
|         max_bits_per_mincu_denom | ue(v) |
|         log2_max_mv_length_horizontal | ue(v) |
|         log2_max_mv_length_vertical | ue(v) |
|     } | |
| } | |

The semantics for the syntax element "tile_boundaries_aligned_flag" may be as follows: tile_boundaries_aligned_flag equal to 1 indicates that all tile boundaries of the corresponding base layer picture have corresponding tile boundaries in the given enhancement layer and there exists no additional tile boundaries in the enhancement layer. Accordingly, for any two enhancement layer picture samples that lie within the same enhancement layer tile, the collocated base layer samples shall also lie within the same reference layer tile, and for any two reference layer picture samples that lie within the same reference layer tile, the collocated enhancement layer samples shall also lie within the same enhancement layer tile. The syntax element tile_boundaries_aligned_flag equal to 0 indicates that there is no restriction on the tile configuration between corresponding enhancement layer and the given reference layer.

Figure 9:
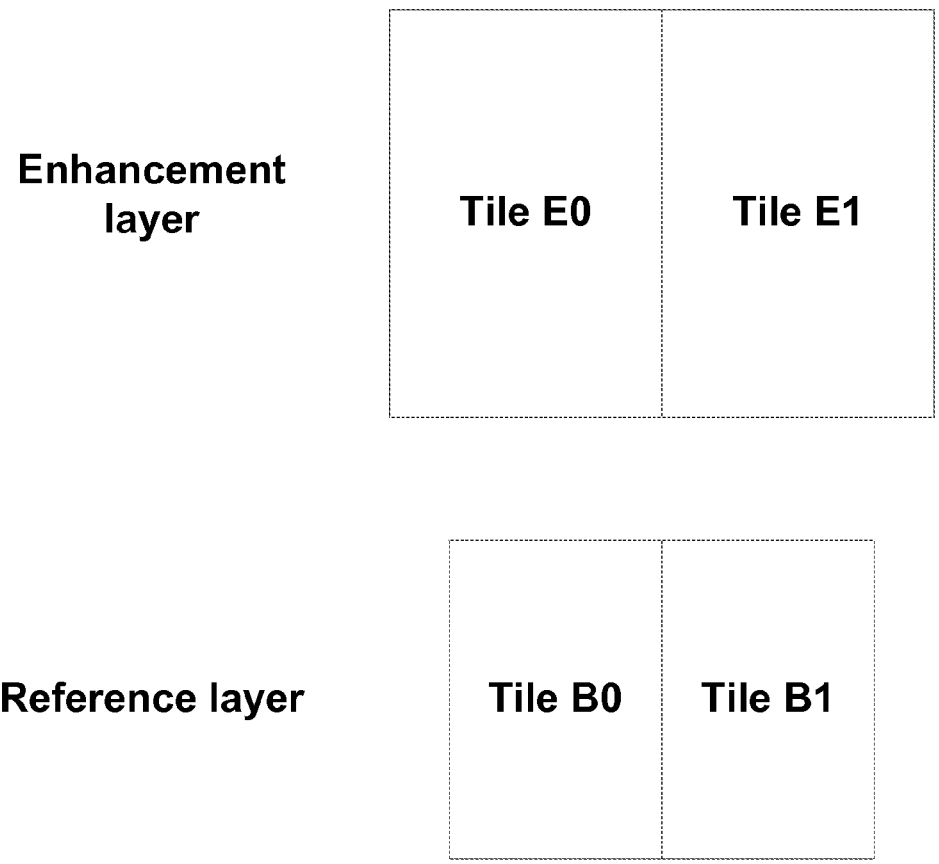
FIG. 9 is a conceptual diagram illustrating an example of parallel processing in a SVC extension of HEVC (SHVC) decoder.

FIG. 9 is a conceptual diagram illustrating an example of parallel processing in an SHVC coder, e.g., video encoder 20 or video decoder 30. In SHVC, an enhancement layer may be predicted from a reference layer, such as a base layer or a lower enhancement layer. Furthermore, either or both pictures of the reference layer and the enhancement layer may be divided into tiles. As shown in the example of FIG. 9, the picture in the reference layer is divided into two tiles, B0 and B1, while the picture in the enhancement layer is also divided into two tiles, E0 and E1. Although the same number of tiles and the same relative positions of the tiles are used for the enhancement layer picture and the reference layer picture in this example, it should be understood that in general, an enhancement layer picture may include the same or different numbers of tiles as a reference layer picture. Moreover, in some examples, an enhancement layer picture may be predicted from two or more reference layer pictures, any or all of which may have the same or different numbers of tiles.

As described in greater detail below, video encoder 20 and video decoder 30 may be configured to utilize various restrictions when coding an enhancement layer picture using a reference layer picture for reference, and either or both of which are partitioned into tiles. FIGS. 10-14, explained in greater detail below, are representative of some of the various restrictions with which video encoder 20 and video decoder 30 may be configured.

FIG. 10 is a conceptual diagram illustrating an example enhancement layer picture 100 predicted from a reference layer picture 104. In this example, enhancement layer picture 100 includes tiles 102A-102D, while reference layer picture 104 includes tiles 106A, 106B. As shown by dashed lines in FIG. 10, tile 102B of enhancement layer picture 100 corresponds to tile 106A of reference layer picture 104, while tile 102C of enhancement layer picture 100 corresponds to tile 106B of reference layer picture 104.

In this example, enhancement layer picture 100 has a different aspect ratio than reference layer picture 104. For instance, reference layer picture 104 may have a 4:3 aspect ratio, whereas enhancement layer picture 100 may have a 16:9 aspect ratio. Thus, tiles 102A, 102D of enhancement layer picture 100 do not have corresponding tiles in reference layer picture 104. For example, tile 102A of enhancement layer picture 100 includes sample 108. As indicated by vertical hashing, sample 108 does not have an available, collocated reference layer (RL) sample in reference layer picture 104. Similarly, sample 114 of tile 102D of enhancement layer picture 100 does not have an available, collocated RL sample. Samples 110, 112, however, do have available, collocated reference layer samples in reference layer picture 104 (as indicated by cross-hatching). In particular, samples 110, 112, correspond to samples 116, 118 of reference layer picture 104.

In this manner, video encoder 20 and video decoder 30 may code video data of tiles 102B, 102C using inter-layer prediction with respect to tiles 106A, 106B, respectively. However, because tiles 102A, 102D do not have corresponding portions in reference layer picture 104, video encoder 20 and video decoder 30 may code tiles 102A, 102D without using inter-layer prediction, e.g., using intra-prediction or temporal prediction. Coding of enhancement layer picture 100 may occur substantially in parallel with coding of reference layer picture 104. For instance, a video coder (e.g., video encoder 20 or video decoder 30) may code tile 106A, then code tile 102B substantially in parallel with tile 106B. Moreover, coding of tiles 102A, 102D may occur before, substantially in parallel with, or after coding tiles 106A, 106B, because tiles 102A, 102D do not depend on data of reference layer picture 104.

FIG. 10 illustrates an example in which tile boundaries of tiles 102B, 102C may be said to be aligned with tile boundaries of tiles 106A, 106B. In some examples, tile boundaries may be said to be aligned when, for any two enhancement layer picture samples that lie within the same enhancement layer tile, the collocated reference layer samples, if available, shall also lie within the same reference layer tile and for any two reference layer picture samples that lie within the same reference layer tile, the collocated enhancement layer samples, if available, shall also lie within the same enhancement layer tile. Because any two samples within tile 102A would correspond to collocated samples within tile 106A, and likewise, any two samples within tile 106A would correspond to collocated samples within tile 102A, boundaries of tile 102A may be said to be aligned with boundaries of tile 106A. Similarly, because any two samples within tile 102B would correspond to collocated samples within tile 106B, and likewise, any two samples within tile 106B would correspond to collocated samples within tile 102B, boundaries of tile 102B may be said to be aligned with boundaries of tile 106B.

In this manner, FIG. 10 portrays an example in which video encoder 20 and video decoder 30 may be configured to code (e.g., encode or decode) a base layer picture comprising a first aspect ratio, and code, substantially in parallel with the base layer picture, an enhancement layer picture comprising a second aspect ratio, wherein the second aspect ratio is larger than the first aspect ratio, and wherein coding the enhancement layer picture comprises coding portions of the enhancement layer picture that are outside an area defined by the first aspect ratio without using inter-layer prediction.

FIG. 11 is a conceptual diagram illustrating an example of extended spatial scalability in which some reference layer (or base layer) samples do not have corresponding enhancement layer samples. In particular, the example of FIG. 11 illustrates enhancement layer picture 130 and reference layer picture 136. As shown in this example, when reference layer picture 136 is spatially upsampled for use as a reference picture for coding enhancement layer picture 130, there are regions of reference layer picture 136 that do not correspond to portions of reference layer picture 130.

More particularly, reference layer picture 136 includes two tiles, tile 138A and tile 138B, while enhancement layer picture 130 includes two generally corresponding tiles, tile 132A and tile 132B. Dash-dotted lines within reference layer picture 136 define regions 140A, 140B that correspond to tiles 132A, 132B, respectively. However, regions 142A, 142B between the dash-dotted lines and the outer boundaries of reference layer picture 136 define regions that do not correspond to actual regions of enhancement layer picture 130. That is, the dash-dotted lines around the boundaries of enhancement layer picture 130 define a region 134 between the outer boundaries of enhancement layer picture 130 and the dash-dotted lines that does not include samples for enhancement layer picture 130, but corresponds to regions 142A, 142B.

For instance, FIG. 11 illustrates two example samples for tile 138A of reference layer picture 136: sample 144 and sample 148. Because sample 144 is within the boundaries of region 140A, sample 144 may be said to correspond to sample 152 of tile 132A in enhancement layer picture 130. On the other hand, sample 148 does not correspond to a sample of enhancement layer picture 130; instead, region 142A corresponds to a portion within region 134 in which no samples are present. In this manner, sample 148 may be described as an example of a sample that does not have a corresponding enhancement layer sample.

Similarly, FIG. 11 illustrates two example samples for tile 138B of reference layer picture 136: sample 146 and sample 150. Because sample 146 is within the boundaries of region 140A, sample 146 may be said to correspond to sample 154 of tile 132B in enhancement layer picture 130. On the other hand, sample 150 does not correspond to a sample of enhancement layer picture 130; instead, region 142B corresponds to a portion within region 134 in which no samples are present. In this manner, sample 150 may be described as another example of a sample that does not have a corresponding enhancement layer sample.

In this manner, FIG. 11 provides an example in which tiles 138A, 138B are aligned with tiles 132A, 132B, respectively. That is, as discussed above, tiles may be said to be "aligned" when, for any two enhancement layer picture samples that lie within the same enhancement layer tile, the collocated reference layer samples, if available, shall also lie within the same reference layer tile and for any two reference layer picture samples that lie within the same reference layer tile, the collocated enhancement layer samples, if available, shall also lie within the same enhancement layer tile. That is, although the boundaries of tiles 138A, 138B are not strictly aligned with the boundaries of tiles 132A, 132B, respectively, samples 148, 150 of reference layer picture 136 do not correspond to available enhancement layer samples. All samples within tile 132A have corresponding samples within region 140A, and likewise, all samples within tile 132B have corresponding samples within region 140B. Similarly, all samples within region 140A correspond to samples within tile 132A, and all samples within region 140B correspond to samples within tile 132B. Thus, tiles 132A, 132B may be said to be aligned with tiles 138A, 138B, respectively.

Figure 12:
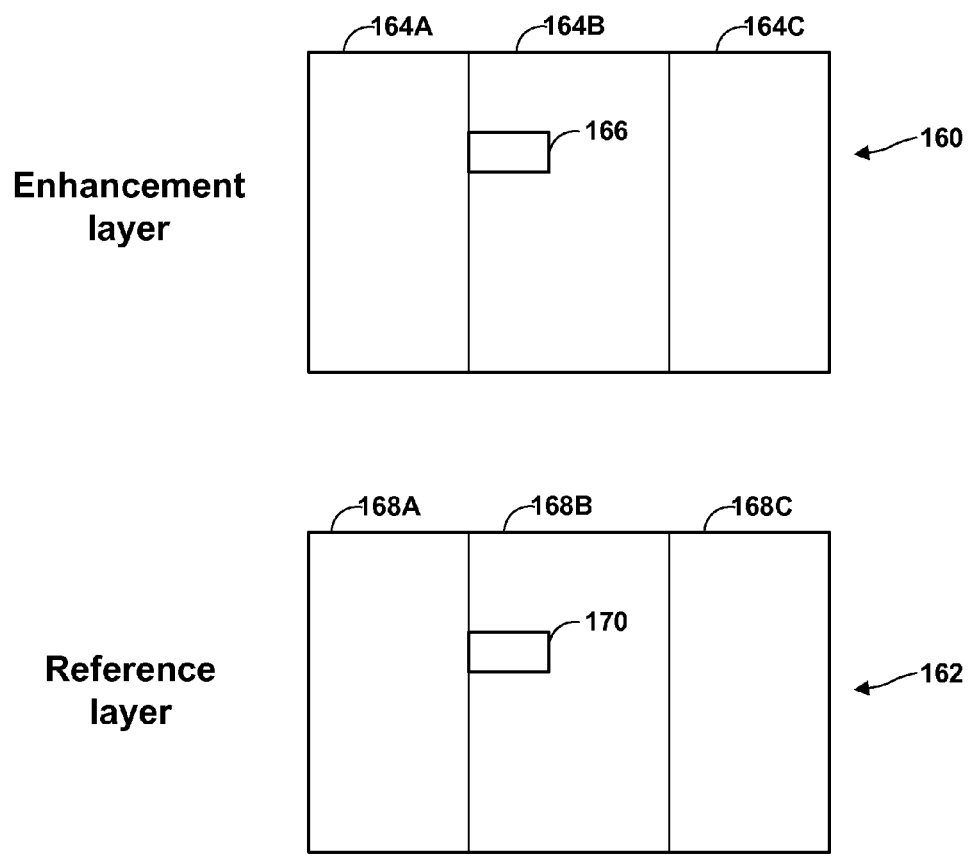
FIG. 12 is a conceptual diagram illustrating a reference layer picture and an enhancement layer picture.

FIG. 12 is a conceptual diagram illustrating a reference layer picture 162 and an enhancement layer picture 160. Enhancement layer picture 160 and reference layer picture 162 may occur in the same access unit (or otherwise correspond to one another). Enhancement layer picture 160 is partitioned into tiles 164A, 164B, and 164C, while reference layer picture 162 is partitioned into tiles 168A, 168B, 168C. In addition, FIG. 12 illustrates example blocks 166, 170 in tiles 164B, 168B, respectively. Block 166 may be said to correspond to block 170, in that block 166 is collocated with block 170.

In accordance with certain example techniques of this disclosure, video encoder 20 and video decoder 30 may be configured to prevent or allow inter-layer prediction of block 166 from block 170 based on various conditions. In one example, video encoder 20 and video decoder 30 may be configured to prevent coding of block 166 using inter-layer texture prediction and/or inter-layer syntax prediction from block 170 when inter-layer filtering and/or reference layer filtering across tiles in reference layer picture 162 is enabled. Video encoder 20 and video decoder 30 may further code data indicating whether tile boundaries of various layers, such as the enhancement layer and the reference layer, are aligned and indicating whether at least one of inter-layer texture prediction and inter-layer syntax prediction are not allowed along or across tile boundaries when inter-layer filtering or reference layer filtering across tile boundaries is enabled for block 170.

Video encoder 20 and video decoder 30 may, additionally or alternatively, code data indicating whether tile boundaries between different layers (e.g., boundaries of tiles 164, 168) are aligned, as well as data indicating whether inter-layer texture prediction and/or inter-layer syntax prediction are not allowed along or across tile boundaries. When inter-layer texture prediction and inter-layer syntax prediction are not allowed along or across tile boundaries, video encoder 20 and video decoder 30 may code blocks of a tile without coding non-aligned base layer tiles. For instance, if block 177 (collocated with block 160) were in a tile that were not aligned with block 164B, video encoder 20 and video decoder 30 could code block 160 without first coding block 177, and therefore, could code block 160 in parallel with block 177.

The data indicating whether inter-layer texture prediction and inter-layer syntax prediction are not allowed along or across the tile boundaries may comprise an inter_layer_pred_not_along_tile_boundary_flag syntax element, as explained above with respect to Table 1. Additionally or alternatively, data indicating whether inter-layer texture prediction and inter-layer syntax prediction are not allowed along or across the tile boundaries may be coded as video usability information (VUI) and/or as part of a supplemental enhancement information (SEI) message.

Figure 13:
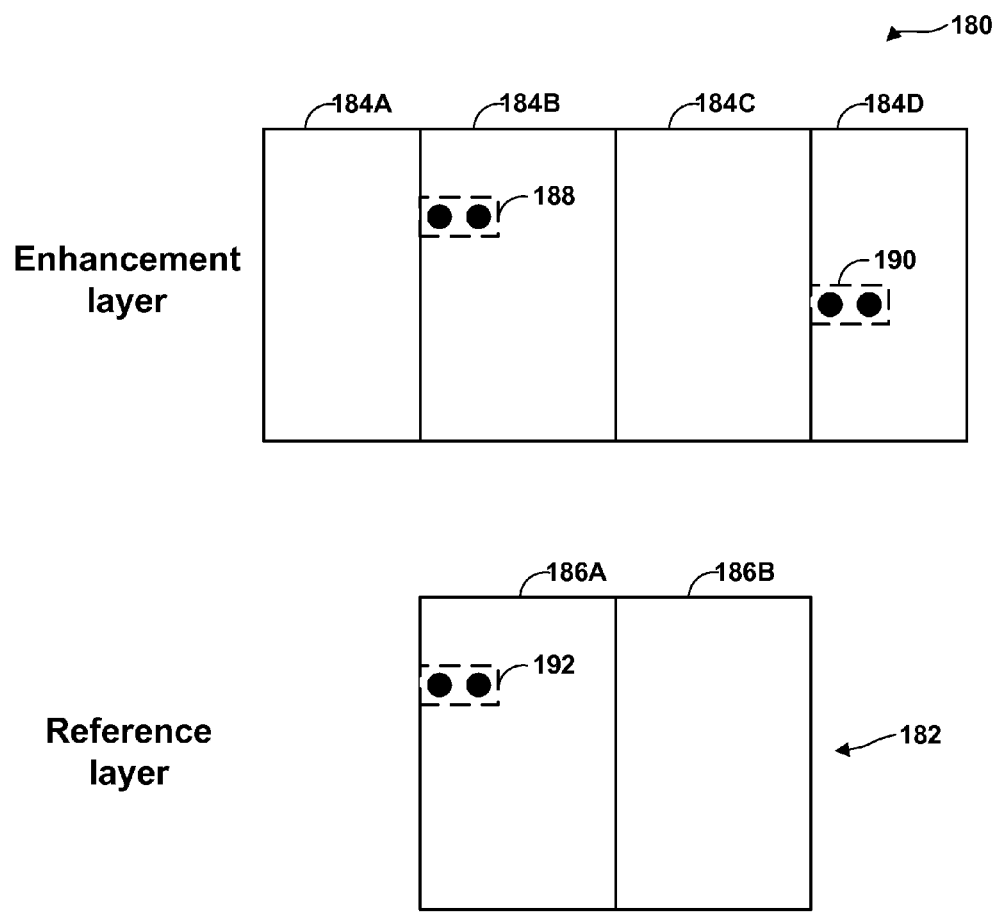
FIG. 13 is a conceptual diagram illustrating example pictures having different aspect ratios.

FIG. 13 is a conceptual diagram illustrating example pictures having different aspect ratios. In particular, in this example, enhancement layer picture 180 has a different aspect ratio than reference layer picture 182. For instance, enhancement layer picture 180 may have an aspect ratio of 16×9, whereas reference layer picture 182 may have an aspect ratio of 4:3. An aspect ratio of 16×9 is an example of an aspect ratio that is larger than the aspect ratio of 4:3. In this example, enhancement layer picture 180 is partitioned into four tiles, namely, tiles 184A-184D. Reference layer picture 182 is partitioned into tiles 186A, 186B. In general, tile 184B may be said to correspond to tile 186A, while tile 184C may be said to correspond to tile 186B.

Although each of tiles 184A-184D and 186A, 186B include a plurality of samples, only certain samples are shown for purposes of brevity and discussion. In particular, in this example, samples 188 are illustrated within tile 184B, samples 192 are illustrated within tile 186A, and samples 190 are illustrated within tile 184D. Furthermore, in this example, samples 188 correspond to samples 192. That is, assuming that tile 184B has the same spatial resolution as tile 186A (originally or after spatial up-sampling), samples 188 are collocated with samples 192. Furthermore, as shown in FIG. 13, samples 188 are within the same enhancement layer tile, tile 184B, and samples 192 are within the same reference layer tile, tile 186A. In this manner, samples 188 represent examples of two enhancement layer picture samples that lie within the same enhancement layer tile, and samples 192 represent examples of available, collocated reference layer samples. The converse is also true: samples 192 represent examples of two reference layer samples, within the same reference layer tile, for which collocated enhancement layer samples (samples 188) are available and also in the same enhancement layer tile (i.e., tile 184B). This property is true for any set of pair of samples within tile 184B and collocated samples within tile 186A.

Accordingly, tiles 184B and 186A may be said to have aligned tile boundaries. Thus, a video coder, such as video encoder 20 or video decoder 30, may perform inter-layer prediction, using samples 192 as reference samples for coding (e.g., encoding by video encoder 20 or decoding by video decoder 30) samples 188. Moreover, video encoder 20 and video decoder 30 may code tile 184B substantially in parallel with tile 186B, assuming that the video coder coded tile 186A prior to coding tile 184B, and also that filtering is not performed across tile boundaries of reference layer 182, e.g. across the boundary between tiles 186A and 186B.

Samples 190, in this example, are shown in tile 184D. However, because enhancement layer picture 180 has a different aspect ratio than reference layer picture 182, there is no tile that corresponds to tile 184 in reference layer picture 182. As such, there are no available samples that correspond (or are collocated with) samples 190 in reference layer picture 182. Although there are no corresponding samples of reference layer picture 182 to samples 190 of enhancement layer picture 180, (and likewise, no tile corresponding to tile 184D) tile boundaries for the tiles of enhancement layer picture 180 may nevertheless be defined as aligned with tile boundaries for tiles of reference layer picture 182.

Accordingly, when tile boundaries of enhancement layer picture 180 and reference layer picture 182 are aligned (as in the example of FIG. 13) and when inter-layer texture prediction and reference layer filtering are not performed across tile boundaries of reference layer picture 182, video encoder 20 may code a value indicating this for a syntax element, e.g., for inter_layerpred_not_along_tile_boundary_flag. Likewise, video decoder 30 may decode a value for a syntax element, such as, inter_layerpred_not_along_tile_boundary_flag, indicating that tile boundaries of enhancement layer picture 180 and reference layer picture 182 are aligned and that inter-layer texture prediction and reference layer filtering are not performed across tile boundaries of reference layer picture 182.

Accordingly, video encoder 20 and video decoder 30 represent examples of a video coder configured to code (e.g., encode or decode) a value for a syntax element representative of whether any two reference layer samples, collocated with two respective enhancement layer picture samples within a common enhancement layer tile, must be within a common reference layer tile, and code the enhancement layer picture samples based at least in part on the value of the syntax element.

FIG. 14 is a conceptual diagram illustrating an enhancement layer picture 200 and a reference layer picture 202 having different numbers of tiles. In this example, enhancement layer picture 200 includes eight tiles, tiles 204A-204H, while reference layer picture 202 includes six tiles, tiles 206A-206F. Accordingly, the boundaries of enhancement layer tiles 204A-204H are not aligned with boundaries of reference layer tiles 206A-206F. That is, there are at least two samples of at least one of tiles 204A-204H for which collocated samples of reference layer picture 202 are not in the same one of reference layer tiles 206A-206F. Likewise, there are at least two samples of at least one of tiles 206A-206F for which collocated samples of enhancement layer picture 200 are not in the same one of enhancement layer tiles 204A-204H.

Nevertheless, even absent boundary alignment between tiles of enhancement layer picture 200 and reference layer picture 202, a video coder (such as video encoder 20 or video decoder 30) may still code one or more of enhancement layer tiles 204A-204H substantially in parallel with one or more of reference layer tiles 206A-206F, using techniques of this disclosure.

In particular, in accordance with techniques of this disclosure, video encoder 20 and video decoder 30 may code, for any or all of tiles 204A-204H, a value for a syntax element, such as max_ref_tile_dec_idc_minus1[i] (where i corresponds to the $i^{th}$ tile of tiles 204A-204H), that indicates a number of tiles in reference layer picture 202 (which is a base layer picture, relative to enhancement layer picture 200) that are to be coded before the corresponding tile of enhancement layer picture 200 can be coded. In particular, when the value is expressed in the form of max_ref_tile_dec_idc_minus1[i], the value of max_ref_tile_dec_idc_minus1[i] is one less than the number of tiles in reference layer picture 202 that are to be coded before the corresponding tile of enhancement layer picture 200 can be coded; thus, video decoder 30 may add one to the value of max_ref_tile_dec_idc_minus1[i] to determine the actual number of tiles in reference layer picture 202 that are to be coded.

For instance, in the example of FIG. 14, video encoder 20 may code values for max_ref_tile_dec_idc_minus1[i] in accordance with Table 8 below:

TABLE 8

| Tile | i | max_ref_tile_dec_idc_minus1[i] |
|---|---|---|
| 204A | 0 | 0 |
| 204B | 1 | 1 |
| 204C | 2 | 2 |
| 204D | 3 | 2 |
| 204E | 4 | 3 |
| 204F | 5 | 4 |
| 204G | 6 | 5 |
| 204H | 7 | 5 |

In this example, video encoder 20 may code a value of 0 for max_ref_tile_dec_idc_minus1[0], corresponding to tile 204A, because adding 1 to the value of 0 yields the value 1. This value, in turn, indicates that 1 tile of reference layer picture 202 (namely, tile 206A) is to be coded before tile 204A can be coded. As can be seen in FIG. 14, by coding tile 206A, all samples of reference layer picture 202 corresponding to tile 204A will have been coded after coding tile 206A, and therefore, video encoder 20 may indicate that only tile 206A is to be coded before tile 204A can be coded. Likewise, video decoder 30 may use the value of max_ref_tile_dec_idc_minus1[0] to determine that after tile 206A has been coded, tile 204A can be coded, e.g., substantially in parallel (or in parallel) with any of tiles 206B-206F.

Also in this example, video encoder 20 may code a value of 1 for max_ref_tile_dec_idc_minus1[1], corresponding to tile 204B, because adding 1 to the value of 1 yields the value 2. This value, in turn, indicates that 2 tiles of reference layer picture 202 (namely, tiles 206A, 206B) are to be coded before tile 204B can be coded. As can be seen in FIG. 14, by coding tiles 206A, 206B, all samples of reference layer picture 202 corresponding to tile 204B will have been coded after coding tile 206B, and therefore, video encoder 20 may indicate that tiles 206A, 206B are to be coded before tile 204B can be coded. Likewise, video decoder 30 may use the value of max_ref_tile_dec_idc_minus1[1] to determine that after tile 206B has been coded, tile 204B can be coded, e.g., substantially in parallel (or in parallel) with any of tiles 206C-206F.

Furthermore, in this example, video encoder 20 may code a value of 2 for max_ref_tile_dec_idc_minus1[2], corresponding to tile 204C, because adding 1 to the value of 2 yields the value 3. This value, in turn, indicates that 3 tiles of reference layer picture 202 (namely, tiles 206A-206C) are to be coded before tile 204C can be coded. Similarly, video encoder 20 may code a value of 2 for max_ref_tile_dec_idc_minus1[3], corresponding to tile 204D. As can be seen in FIG. 14, by coding tiles 206A-206C, all samples of reference layer picture 202 corresponding to tiles 204C and 204D will have been coded after coding tile 206C, and therefore, video encoder 20 may indicate that tiles 206A-206C are to be coded before tiles 204C, 204D can be coded. Likewise, video decoder 30 may use the values of max_ref_tile_dec_idc_minus1[2] and max_ref_tile_dec_idc_minus1[3] to determine that after tile 206C has been coded, tiles 204C and 204D can be coded, e.g., substantially in parallel (or in parallel) with any of tiles 206D-206F.

Moreover, in this example, video encoder 20 may code a value of 3 for max_ref_tile_dec_idc_minus1[4], corresponding to tile 204E, because adding 1 to the value of 3 yields the value 4. This value, in turn, indicates that 4 tiles of reference layer picture 202 (namely, tiles 206A, 206B) are to be coded before tile 204B can be coded. As can be seen in FIG. 14, by coding tiles 206A-206D, all samples of reference layer picture 202 corresponding to tile 204E will have been coded after coding tile 206D, and therefore, video encoder 20 may indicate that tiles 206A-206D are to be coded before tile 204E can be coded. Likewise, video decoder 30 may use the value of max_ref_tile_dec_idc_minus1[4] to determine that after tile 206D has been coded, tile 204E can be coded, e.g., substantially in parallel (or in parallel) with any of tiles 206E, 206F.

Also in this example, video encoder 20 may code a value of 4 for max_ref_tile_dec_idc_minus1[5], corresponding to tile 204F, because adding 1 to the value of 4 yields the value 5. This value, in turn, indicates that 5 tiles of reference layer picture 202 (namely, tiles 206A-206E) are to be coded before tile 204F can be coded. As can be seen in FIG. 14, by coding tiles 206A-206E, all samples of reference layer picture 202 corresponding to tile 204F will have been coded after coding tile 206E, and therefore, video encoder 20 may indicate that tiles 206A-206E are to be coded before tile 204F can be coded. Likewise, video decoder 30 may use the value of max_ref_tile_dec_idc_minus1[5] to determine that after tile 206E has been coded, tile 204F can be coded, e.g., substantially in parallel (or in parallel) with tile 206F.

Furthermore, in this example, video encoder 20 may code a value of 5 for max_ref_tile_dec_idc_minus1[6], corresponding to tile 204G, because adding 1 to the value of 5 yields the value 6. This value, in turn, indicates that all 6 tiles of reference layer picture 202 (namely, tiles 206A-206F) are to be coded before tile 204G can be coded. Similarly, video encoder 20 may code a value of 5 for max_ref_tile_dec_idc_minus1[7], corresponding to tile 204H. As can be seen in FIG. 14, by coding tiles 206A-206F, all samples of reference layer picture 202 corresponding to tiles 204G and 204H will have been coded after coding tile 206F, and therefore, video encoder 20 may indicate that tiles 206A-206F are to be coded before tiles 204G, 204H can be coded. Likewise, video decoder 30 may use the values of max_ref_tile_dec_idc_minus1[6] and max_ref_tile_dec_idc_minus1[7] to determine that after tile 206F has been coded, tiles 204G and 204H can be coded, e.g., substantially in parallel (or in parallel) with tiles of a subsequent picture in the reference layer (that is, a picture in the reference layer following picture 202 in coding order).

Accordingly, video encoder 20 and video decoder 30 represent examples of a video coder configured to code, for a tile of an enhancement layer picture, data indicating a number of tiles in a base layer picture that need to be coded before the tile of the enhancement layer picture can be coded, code tiles of the base layer picture corresponding to the number of tiles, and, after coding the tiles of the base layer picture, code the tile of the enhancement layer picture substantially in parallel with at least one other tile in the base layer picture.

Figure 15:
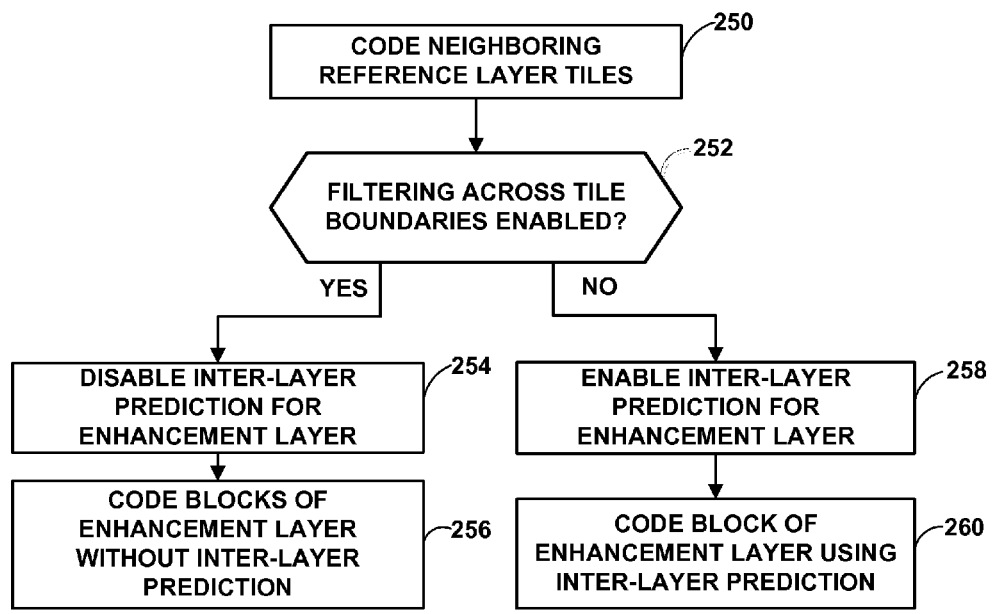
FIG. 15 is a flowchart illustrating an example method for enabling or disabling inter-layer prediction in accordance with the techniques of this disclosure.

FIG. 15 is a flowchart illustrating an example method for enabling or disabling inter-layer prediction in accordance with the techniques of this disclosure. The method of FIG. 15 is generally described as being performed by a video coder. The video coder may correspond to, for example, video encoder 20 or video decoder 30, or other such video coding devices (e.g., video transcoding devices).

Initially, the video coder may code one or more neighboring reference layer tiles (250). That is, the video coder may code blocks (e.g., CUs or PUs) of one or more tiles in a reference layer picture. The video coder may then determine whether filtering across tile boundaries is enabled (252). For instance, when performed by video encoder 20, video encoder 20 may determine whether to enable filtering across tile boundaries for the reference layer picture. Video encoder 20 may also encode a syntax element indicating whether filtering across tile boundaries for the reference layer picture is enabled. On the other hand, when performed by video decoder 30, video decoder 30 may determine whether filtering across tile boundaries is enabled from a syntax element.

Filtering across tile boundaries may include either or both of inter-layer filtering across tile boundaries (e.g., where the reference layer picture is coded with reference to yet another reference layer picture for which filtering across tile boundaries is enabled) or reference layer filtering, e.g., de-blocking, up-sampling for the whole picture, or any other filtering operation that uses a filter applied to pixels (also referred to as samples) from two or more distinct tiles of the reference layer picture.

In some examples, the video coder may further determine whether tile boundaries of different layers are aligned. For instance, video encoder 20 may determine whether to align tile boundaries and encode a syntax element indicating whether tile boundaries are aligned, while video decoder 30 may decode the syntax element to determine whether tile boundaries are aligned. Likewise, the video coder may code a syntax element indicating whether inter-layer prediction is not allowed along or across tile boundaries, e.g., an inter_layerpred_not_along_tile_boundary_flag, as discussed above with respect to Table 1. In addition or in the alternative, such syntax elements may be included in any or all of video usability information (VUI), a sequence parameter set (SPS), a picture parameter set (PPS), a video parameter set (VPS), a slice header, a supplemental enhancement information (SEI) message, or the like.

If filtering across tile boundaries for the reference layer picture is enabled ("YES" branch of 252), the video coder may disable inter-layer prediction for an enhancement layer picture (254). The video coder may then code blocks of the enhancement layer picture without using inter-layer prediction (256). Inter-layer prediction may include either or both of inter-layer texture prediction (e.g., prediction of luminance and/or chrominance data) and inter-layer syntax prediction. The video coder may code blocks of the enhancement layer picture in parallel with any of the blocks of the reference layer picture, because the reference layer picture will not actually be used for reference when coding the enhancement layer picture. Thus, although the example of FIG. 15 depicts coding neighboring reference layer tiles prior to coding the blocks of the enhancement layer picture, in some examples, the video coder may simply determine whether filtering across tile boundaries is enabled for the reference layer picture, and if so, immediately begin coding the enhancement layer picture in parallel with the reference layer picture.

On the other hand, if filtering across tile boundaries for the reference layer picture is not enabled ("NO" branch of 252), the video coder may enable inter-layer prediction for the enhancement layer picture (258). The video coder may then code a block of the enhancement layer using inter-layer prediction (260). In particular, after having coded one or more of the reference layer tiles, the video coder may code blocks of a tile of the enhancement layer picture having aligned boundaries with the coded reference layer tile. Furthermore, the video coder may code the blocks of the tile of the enhancement layer picture in parallel with a subsequent tile of the reference layer picture.

It should be understood that the enhancement layer picture and the reference layer picture are generally included in the same access unit. That is, the enhancement layer picture and the reference layer picture correspond to the same output time (or display time).

In this manner, the method of FIG. 15 represents an example of a method including, when coding (e.g., encoding or decoding) an enhancement layer block in an enhancement layer tile, preventing coding of the enhancement layer block using inter-layer texture prediction or inter-layer syntax prediction from a collocated base layer block for which inter-layer filtering or reference layer filtering across tiles in a reference layer picture in an access unit including both the enhancement layer tile and the base layer block is enabled, and coding (encoding or decoding) the collocated block substantially in parallel with the enhancement layer block when inter-layer filtering or reference layer filtering across the tile boundaries in the reference layer picture is enabled. In the alternative, when inter-layer filtering and reference-layer filtering across the boundaries of the tiles in the reference layer picture are not enabled, the method may include coding (encoding or decoding) the enhancement layer block in parallel with a subsequent tile of the reference layer picture.

Figure 16:
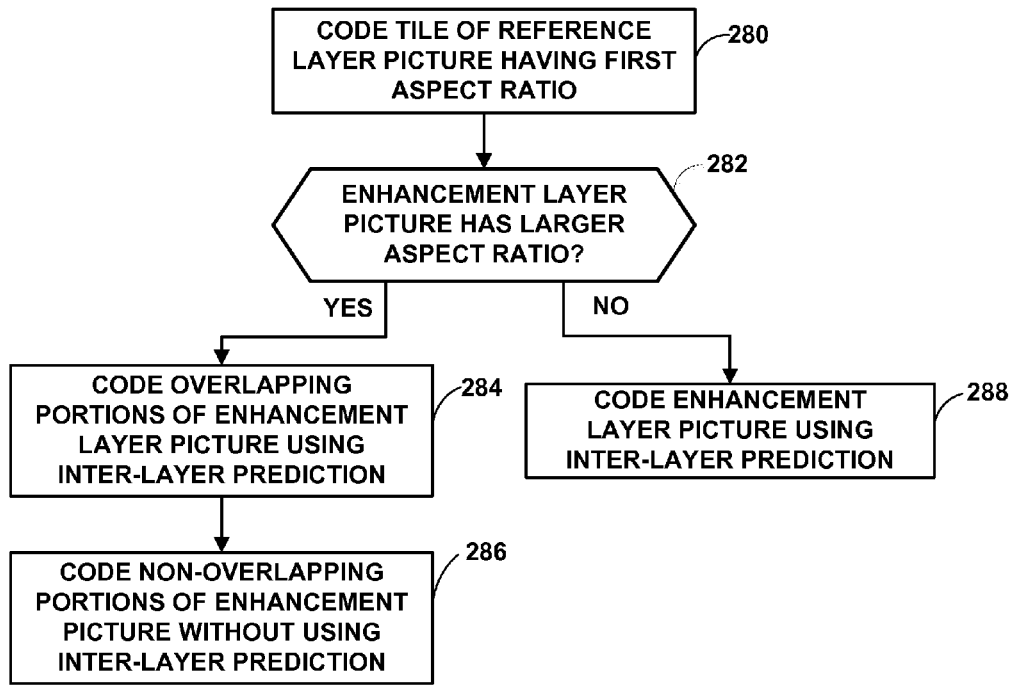
FIG. 16 is a flowchart illustrating an example method for coding pictures of an enhancement layer and a reference layer in parallel when the pictures have different aspect ratios, in accordance with techniques of this disclosure.

FIG. 16 is a flowchart illustrating an example method for coding pictures of an enhancement layer and a reference layer in parallel when the pictures have different aspect ratios, in accordance with techniques of this disclosure. The method of FIG. 16 is generally described as being performed by a video coder. The video coder may correspond to, for example, video encoder 20 or video decoder 30, or other such video coding devices (e.g., video transcoding devices).

In this example, the video coder first codes a tile of a reference layer picture having a first aspect ratio (280). For instance, the reference layer picture may have an aspect ratio of 4:3. The video coder may then determine whether an enhancement layer picture has an expect ratio that is larger than the aspect ratio of the reference layer picture (282). For instance, the enhancement layer picture may have an aspect ratio of 16:9, whereas the reference layer picture may have an aspect ratio of 4:3.

If the enhancement layer picture has an aspect ratio that is larger than the aspect ratio of the reference layer picture ("YES" branch of 282), there will be at least some portions (e.g., tiles) of the enhancement layer picture that do not overlap with the reference layer picture. Therefore, the video coder may code overlapping portions of the enhancement layer picture using inter-layer prediction (284), and code non-overlapping portions of the enhancement layer picture without using inter-layer prediction (286). Furthermore, the video coder may code the non-overlapping portions of the enhancement layer picture in parallel with any portion of the reference layer picture, while the video coder may code overlapping portions of the enhancement layer picture in parallel with subsequent portions of the reference layer picture. For instance, referring back to FIG. 13, the video coder may code tiles 184A, 184D in parallel with any portion of reference layer picture 182. The video coder may code tile 184B in parallel with tile 186B.

On the other hand, if the enhancement layer picture does not have a larger aspect ratio than the aspect ratio of the reference layer picture ("NO" branch of 282), the video coder may code the enhancement layer picture completely using inter-layer prediction (288), and may code certain tiles of the enhancement layer picture in parallel with other tiles of the reference layer picture.

In this manner, the method of FIG. 16 represents an example of a method including coding (e.g., encoding or decoding) a base layer picture comprising a first aspect ratio, and coding (e.g., encoding or decoding), substantially in parallel with the base layer picture, an enhancement layer picture comprising a second aspect ratio, wherein the second aspect ratio is larger than the first aspect ratio, and wherein coding the enhancement layer picture comprises coding portions of the enhancement layer picture that are outside an area defined by the first aspect ratio without using inter-layer prediction.

Figure 17:
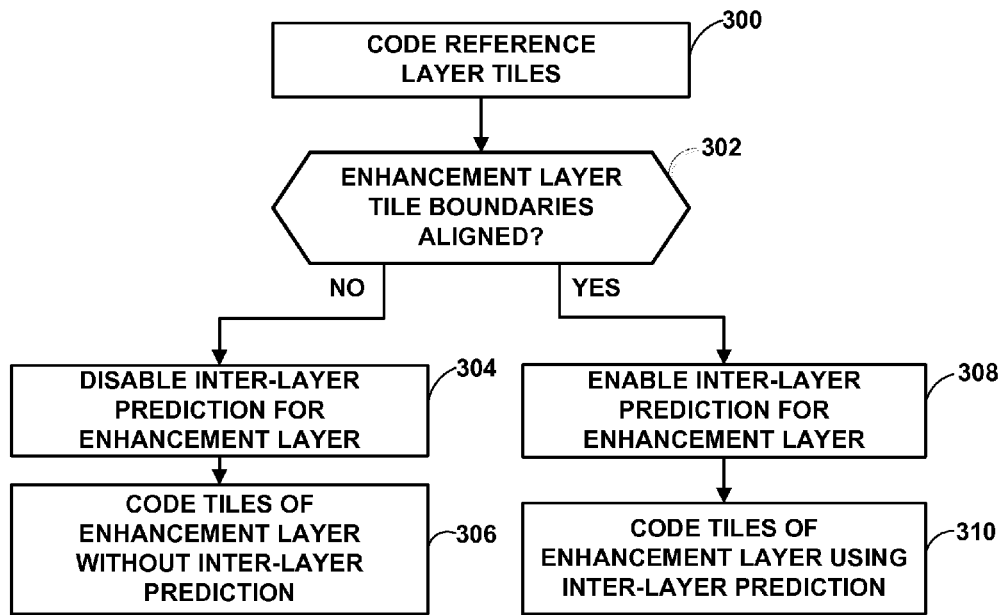
FIG. 17 is a flowchart illustrating an example method for coding an enhancement layer picture based on whether tile boundaries of the enhancement layer picture are aligned with tile boundaries of a reference layer picture.

FIG. 17 is a flowchart illustrating an example method for coding an enhancement layer picture based on whether tile boundaries of the enhancement layer picture are aligned with tile boundaries of a reference layer picture. The method of FIG. 17 is generally described as being performed by a video coder. The video coder may correspond to, for example, video encoder 20 or video decoder 30, or other such video coding devices (e.g., video transcoding devices).

In this example, the video coder codes one or more reference layer tiles (300). The video coder then determines whether tile boundaries of the enhancement layer are aligned (302). For example, video encoder 20 may determine whether to align reference layer boundaries, and may encode a value for a syntax element indicating whether tile boundaries are aligned, such as tile_boundaries_aligned_flag, whereas video decoder 30 may determine whether reference layer boundaries are aligned, e.g., based on a value of a syntax element, such as tile_boundaries_aligned_flag. Tile boundaries of the enhancement layer picture may be said to be aligned with tile boundaries of the reference layer picture when, for any two enhancement layer picture samples that lie within the same enhancement layer tile, the collocated reference layer samples, if available, also lie within the same reference layer tile and for any two reference layer picture samples that lie within the same reference layer tile, the collocated enhancement layer samples, if available, also lie within the same enhancement layer tile.

When the tile boundaries of the enhancement layer picture are not aligned with the tile boundaries of the reference layer picture ("NO" branch of 302), the video coder may disable inter-layer prediction for the enhancement layer (304) and code the tiles of the enhancement layer picture without using inter-layer prediction (306). Furthermore, the video coder may code any or all of the tiles of the enhancement layer picture in parallel with any portion of the reference layer picture, because inter-layer prediction is disabled.

On the other hand, when the tile boundaries of the enhancement layer picture are aligned with the tile boundaries of the reference layer picture ("YES" branch of 302), the video coder may enable inter-layer prediction for the enhancement layer picture (308) and code tiles of the enhancement layer picture using inter-layer prediction (310). In particular, after coding a tile of the reference layer picture, the video coder may begin coding a corresponding tile of the enhancement layer picture in parallel with a subsequent tile of the reference layer picture.

If there are tiles of the enhancement layer picture that do not correspond to the reference layer picture (e.g., as discussed above with respect to FIG. 16), the video coder may code these tiles in parallel with any portion of the reference layer picture. Even when such tiles exist, the tile boundaries may still be said to be aligned, because the "collocated" samples for such tiles in the reference layer picture will not be available, per the example definition provided above.

In this manner, the method of FIG. 17 represents an example of a method including coding (e.g., encoding or decoding) a value for a syntax element representative of whether any two reference layer samples, collocated with two respective enhancement layer picture samples within a common enhancement layer tile, must be within a common reference layer tile, and coding (e.g., encoding or decoding) the enhancement layer picture samples based at least in part on the value of the syntax element.

Figure 18:
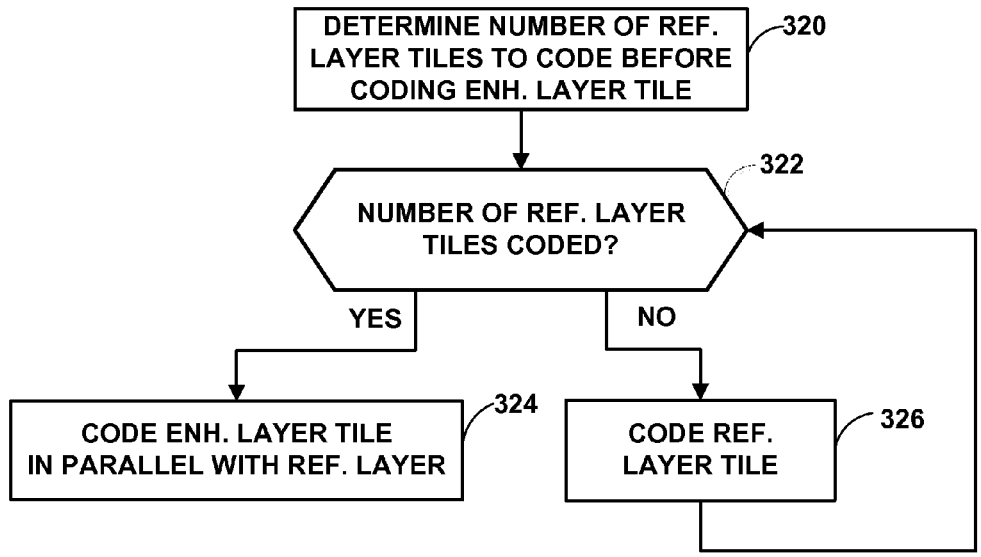
FIG. 18 is a flowchart illustrating an example method for coding tiles of an enhancement layer picture in parallel with a reference layer picture even when the tile boundaries are not aligned, in accordance with techniques of this disclosure.

FIG. 18 is a flowchart illustrating an example method for coding tiles of an enhancement layer picture in parallel with a reference layer picture even when the tile boundaries are not aligned, in accordance with techniques of this disclosure. The method of FIG. 18 is generally described as being performed by a video coder. The video coder may correspond to, for example, video encoder 20 or video decoder 30, or other such video coding devices (e.g., video transcoding devices).

The video coder may determine a number of reference layer tiles (that is, a number of tiles in a reference layer picture) to be coded before coding a particular enhancement layer tile (that is, a tile of a corresponding enhancement layer picture) (320). In particular, the video coder may determine a number of reference layer tiles to be coded for each enhancement layer tile. For instance, assuming that coding proceeds in a raster scan order (left-to-right, top-to-bottom), video encoder 20 may determine a number of reference layer tiles that are to be coded before a particular enhancement layer tile can be coded, that is, before all collocated samples in the reference layer tile for the enhancement layer tile have been coded. Although raster scan order is used for purposes of example, other tile scan orders may be used. Video encoder 20 may encode a value for a syntax element corresponding to the enhancement layer tile, e.g., a value for max_ref_tile_dec_idc_minus1[i], where i represents an index for the enhancement layer tile in raster scan order. Video decoder 30 may decode a value for the syntax element to determine a number of tiles to decode before decoding the enhancement layer tile. The data indicating the number of reference layer tiles to be coded may form part of a video parameter set (VPS), a sequence parameter set (SPS), a picture parameter set (SPS), a slice header, video usability information (VUI), and/or a supplemental enhancement information (SEI) message.

The video coder may then determine whether the number of reference layer tiles has been coded (322). If not ("NO" branch of 322), the video coder may code a next reference layer tile (326). The video coder may proceed to code reference layer tiles until the determined number of reference layer tiles has been coded. After the number of reference layer tiles has been coded ("YES" branch of 322), the video coder may code the enhancement layer tile in parallel with one or more reference layer tiles (324).

In this manner, the method of FIG. 18 represents an example of a method including coding (e.g., encoding or decoding), for a tile of an enhancement layer picture, data indicating a number of tiles in a base layer picture that need to be coded before the tile of the enhancement layer picture can be coded, coding (e.g., encoding or decoding) tiles of the base layer picture corresponding to the number of tiles, and, after coding the tiles of the base layer picture, coding (e.g., encoding or decoding) the tile of the enhancement layer picture substantially in parallel with at least one other tile in the base layer picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding, for a tile of an enhancement layer picture, data indicating a number of tiles in a base layer picture corresponding to the enhancement layer picture that need to be decoded before the tile of the enhancement layer picture can be decoded, wherein each of the tiles comprises a respective integer number of coding tree blocks co-occurring in one column and one row, ordered consecutively in coding tree block raster scan of the corresponding tile;
    decoding tiles of the base layer picture corresponding to the number of tiles; and
    after decoding the tiles of the base layer picture, decoding the tile of the enhancement layer picture in parallel with at least one other tile in the base layer picture, wherein the at least one other tile comprises a tile other than the tiles corresponding to the number of tiles.

2. The method of claim 1, wherein decoding the data indicating the number of tiles comprises decoding a max_ref_t- ile_dec_idc_minus1 syntax element that indicates a maximum number of tiles in the base layer picture that need to be decoded before the tile of the enhancement layer picture can be decoded.

3. The method of claim 1, further comprising deriving the corresponding tiles based on a tile scan order of the base layer picture and the number.

4. The method of claim 1, wherein decoding the data comprises decoding the data in at least one of a video parameter set (VPS), a sequence parameter set (SPS), a picture parameter set (PPS), a slice header, video usability information (VUI), and a supplemental enhancement information (SEI) message.

5. The method of claim 1, further comprising decoding, for the tile, data indicating respective numbers of tiles in a plurality of base layer pictures that need to be decoded before the tile of the enhancement layer picture can be decoded.

6. The method of claim 1, wherein the data indicating the number of tiles comprises identifiers for the corresponding tiles.

7. The method of claim 1, further comprising decoding data indicative of a tile scanning process at the base layer for the reference layer.

8. A method of encoding video data, the method comprising:
    encoding, for a tile of an enhancement layer picture, data indicating a number of tiles in a base layer picture corresponding to the enhancement layer picture that need to be decoded before the tile of the enhancement layer picture can be decoded, wherein each of the tiles comprises a respective integer number of coding tree blocks co-occurring in one column and one row, ordered consecutively in coding tree block raster scan of the corresponding tile;
    encoding tiles of the base layer picture corresponding to the number of tiles; and
    after encoding the tiles of the base layer picture, encoding the tile of the enhancement layer picture in parallel with at least one other tile in the base layer picture, wherein the at least one other tile comprises a tile other than the tiles corresponding to the number of tiles.

9. The method of claim 8, wherein encoding the data indicating the number of tiles comprises encoding a max_ref_tile_dec_idc_minus1 syntax element that indicates a maximum number of tiles in the base layer picture that need to be decoded before the tile of the enhancement layer picture can be decoded.

10. The method of claim 8, further comprising deriving the corresponding tiles based on a tile scan order of the base layer picture and the number.

11. The method of claim 8, wherein encoding the data comprises encoding the data in at least one of a video parameter set (VPS), a sequence parameter set (SPS), a picture parameter set (PPS), a slice header, video usability information (VUI), and a supplemental enhancement information (SEI) message.

12. The method of claim 8, further comprising encoding, for the tile, data indicating respective numbers of tiles in a plurality of base layer pictures that need to be decoded before the tile of the enhancement layer picture can be decoded.

13. The method of claim 8, wherein the data indicating the number of tiles comprises identifiers for the corresponding tiles.

14. The method of claim 8, further comprising encoding data indicative of a tile scanning process at the base layer for the reference layer.

15. A device for coding video data, the device comprising:
a memory configured to store video data; and
a video coder configured to:
    code, for a tile of an enhancement layer picture, data indicating a number of tiles in a base layer picture of the video data, the base layer picture corresponding to the enhancement layer picture, that need to be coded before the tile of the enhancement layer picture can be coded, wherein each of the tiles comprises a respective integer number of coding tree blocks co-occurring in one column and one row, ordered consecutively in coding tree block raster scan of the corresponding tile,
    code tiles of the base layer picture corresponding to the number of tiles, and,
    after coding the tiles of the base layer picture, code the tile of the enhancement layer picture in parallel with at least one other tile in the base layer picture, wherein the at least one other tile comprises a tile other than the tiles corresponding to the number of tiles.

16. The device of claim 15, wherein the data indicating the number of tiles comprises a max_ref_tile_dec_idc_minus1 syntax element that indicates a maximum number of tiles in the base layer picture that need to be decoded before the tile of the enhancement layer picture can be decoded.

17. The device of claim 15, wherein the video coder is configured to derive the corresponding tiles based on a tile scan order of the base layer picture and the number.

18. The device of claim 15, wherein the video coder is configured to code the data in at least one of a video parameter set (VPS), a sequence parameter set (SPS), a picture parameter set (PPS), a slice header, video usability information (VUI), and a supplemental enhancement information (SEI) message.

19. The device of claim 15, wherein the video coder is further configured to code, for the tile, data indicating respective numbers of tiles in a plurality of base layer pictures that need to be decoded before the tile of the enhancement layer picture can be decoded.

20. The device of claim 15, wherein the data indicating the number of tiles comprises identifiers for the corresponding tiles.

21. The device of claim 15, wherein the video coder is further configured to code data indicative of a tile scanning process at the base layer for the reference layer.

22. The device of claim 15, wherein the video coder comprises at least one of a video encoder or a video decoder.

23. A device for coding video data, the device comprising:
means for coding, for a tile of an enhancement layer picture, data indicating a number of tiles in a base layer picture corresponding to the enhancement layer picture that need to be coded before the tile of the enhancement layer picture can be coded, wherein each of the tiles comprises a respective integer number of coding tree blocks co-occurring in one column and one row, ordered consecutively in coding tree block raster scan of the corresponding tile;
means for coding tiles of the base layer picture corresponding to the number of tiles; and
means for coding, after coding the tiles of the base layer picture, the tile of the enhancement layer picture in parallel with at least one other tile in the base layer picture, wherein the at least one other tile comprises a tile other than the tiles corresponding to the number of tiles.

24. The device of claim 23, wherein the means for coding the data indicating the number of tiles comprises means for coding a max_ref_tile_dec_idc_minus1 syntax element that indicates a maximum number of tiles in the base layer picture that need to be decoded before the tile of the enhancement layer picture can be decoded.

25. The device of claim 23, further comprising means for deriving the corresponding tiles based on a tile scan order of the base layer picture and the number.

26. The device of claim 23, wherein the means for coding the data comprises means for coding the data in at least one of a video parameter set (VPS), a sequence parameter set (SPS), a picture parameter set (PPS), a slice header, video usability information (VUI), and a supplemental enhancement information (SEI) message.

27. The device of claim 23, further comprising means for coding, for the tile, data indicating respective numbers of tiles in a plurality of base layer pictures that need to be decoded before the tile of the enhancement layer picture can be decoded.

28. The device of claim 23, wherein the data indicating the number of tiles comprises identifiers for the corresponding tiles.

29. The device of claim 23, further comprising means for coding data indicative of a tile scanning process at the base layer for the reference layer.

30. A non-transitory computer-readable storage medium having stored thereon instructions that, when executed, cause a processor to:
  code, for a tile of an enhancement layer picture, data indicating a number of tiles in a base layer picture corresponding to the enhancement layer picture that need to be coded before the tile of the enhancement layer picture can be coded, wherein each of the tiles comprises a respective integer number of coding tree blocks co-occurring in one column and one row, ordered consecutively in coding tree block raster scan of the corresponding tile;
  code tiles of the base layer picture corresponding to the number of tiles; and
  after coding the tiles of the base layer picture, code the tile of the enhancement layer picture in parallel with at least one other tile in the base layer picture, wherein the at least one other tile comprises a tile other than the tiles corresponding to the number of tiles.

31. The non-transitory computer-readable storage medium of claim 30, wherein the instructions that cause the processor to code the data indicating the number of tiles comprise instructions that cause the processor to code a max_ref_tile_dec_idc_minus1 syntax element that indicates a maximum number of tiles in the base layer picture that need to be decoded before the tile of the enhancement layer picture can be decoded.

32. The non-transitory computer-readable storage medium of claim 30, further comprising instructions that cause the processor to derive the corresponding tiles based on a tile scan order of the base layer picture and the number.

33. The non-transitory computer-readable storage medium of claim 30, wherein the instructions that cause the processor to code the data comprise instructions that cause the processor to code the data in at least one of a video parameter set (VPS), a sequence parameter set (SPS), a picture parameter set (PPS), a slice header, video usability information (VUI), and a supplemental enhancement information (SEI) message.

34. The non-transitory computer-readable storage medium of claim 30, further comprising instructions that cause the processor to code, for the tile, data indicating respective numbers of tiles in a plurality of base layer pictures that need to be decoded before the tile of the enhancement layer picture can be decoded.

35. The non-transitory computer-readable storage medium of claim 30, wherein the data indicating the number of tiles comprises identifiers for the corresponding tiles.

36. The non-transitory computer-readable storage medium of claim 30, further comprising instructions that cause the processor to code data indicative of a tile scanning process at the base layer for the reference layer.

* * * * *